(12) United States Patent
Hankawa et al.

(10) Patent No.: US 7,706,082 B2
(45) Date of Patent: Apr. 27, 2010

(54) ZOOM LENS AND IMAGING APPARATUS INCORPORATING THE SAME

(75) Inventors: Masashi Hankawa, Shibuya-ku (JP); Tomoyuki Satori, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/313,260

(22) Filed: Nov. 17, 2008

(65) Prior Publication Data

US 2009/0195886 A1 Aug. 6, 2009

(30) Foreign Application Priority Data

Nov. 20, 2007 (JP) .............................. 2007-300261

(51) Int. Cl.
*G02B 15/14* (2006.01)
(52) U.S. Cl. ........................................ 359/687; 396/73
(58) Field of Classification Search ................. 359/687, 359/676; 348/240.99–240.3, 335–369; 396/72–88
See application file for complete search history.

(56) References Cited

FOREIGN PATENT DOCUMENTS

JP 2006-330657 12/2006

*Primary Examiner*—Darryl J Collins
(74) *Attorney, Agent, or Firm*—Kenyon & Kenyon LLP

(57) ABSTRACT

The invention relates to a zoom lens and an imaging apparatus incorporating the same. The zoom lenses comprises, in order from its object side, a positive first lens group G1, a negative second lens group G2, a positive third lens group G3, and a positive fourth lens group G4. Zooming is implemented by changing the spacing between the respective lens groups. Upon received in a lens mount, the third lens group is shifted and positioned while its optical axis is tilted at an angle of ±45° with those of other lens groups or placed substantially horizontal. At least one of lenses in the second lens group G2 or the fourth lens group G4 is configured such that a portion of that lens proximate to the third lens group being received in the lens mount is cut away. The following condition (1) is satisfied:

$$0.3 < d \times (F_{nt}/f_t) < 3.0 \quad (1)$$

where d is a distance between the center point of axial thickness of the third lens group being received in the lens mount and the optical axis, $F_{nt}$ is an F-number at a telephoto end, and $f_t$ is a focal length at the telephoto end.

16 Claims, 18 Drawing Sheets

(a)

(b)

(c)

(d)

(e)

ZOOM LENS AND IMAGING APPARATUS INCORPORATING THE SAME

This application claims benefit of Japanese Application No. 2007-300261 filed in Japan on Nov. 20, 2007, the content of which are incorporated by this reference.

BACKGROUND OF THE INVENTION

The present invention relates generally to a zoom lens and an imaging apparatus incorporating the same, and more particularly to a zoom lens of small format that lends itself to imaging apparatus inclusive of video cameras and digital cameras.

In recent years, imaging apparatus such as digital cameras designed to take images of subjects using solid-state imaging devices such as CCDs or CMOSs have gone mainstream in place of silver-halide film cameras. Further, they have now a wide spectrum of categories from the commercial high-end type to the compact low-end type. The present invention gives weight to the compact low-end type category in particular.

Users of such low-end type digital cameras would enjoy snapping shots over a wide range of scenes at any time in any place. For this reason, preference is given to small-format digital cameras, especially of the type that can be well put away in the pockets of clothing or baggage, are convenient to carry around, and are slimmed down in their thickness direction, and there is a mounting demand for size reductions of taking lens systems, too.

On the other hand, as the pixels of imaging devices are now on the increase, there is a mounting demand for higher optical performance keeping pace with a lot more pixels. Further, to make sure mass productivity, it is required to minimize the sensitivity of optical performance deterioration to production errors in the process of processing and assembling lenses. From the point of view of making taking ranges wide, high zooming lenses having zoom ratios exceeding 5 or 7, too, are generally available; much higher zoom ratios are expected, and so are wider-angle arrangements. To meet such demands, there are now various types of zoom lenses proposed in the art.

Among prior zoom lenses having relatively high zoom ratios and compact format adapted to shift some lens groups to receive or put away them in a lens mount, there is a type comprising, in order from its object side, a first lens group of positive refracting power, a second lens group of negative refracting power, a third lens group of positive refracting power and a fourth lens group of positive refracting power, as set forth in the following patent publication 1.

[Patent Publication 1]

JP(A)2006-330657

Problems with the zoom lens put forward in Patent Publication 1 are, however, that the volume of the whole unit grows too large for size reductions, because of an increased amount of shift of the third lens group at the time when a lens barrel is receive in the lens mount.

The invention has been made to meet the users demands for making taking ranges wider than ever before without detrimental to the ability of cameras to be carried around: the invention has for its object the provision of a less costly zoom lens that satisfies the requirements of making cameras smaller and having high zoom ratios and wide-angle arrangements at the same time, enables the image quality of taken images to be well kept, and lends itself to imaging devices such as CCDs or CMOSs as well as electronic imaging apparatus incorporating the same.

SUMMARY OF THE INVENTION

According to the invention, the aforesaid object is accomplishable by the provision of a zoom lens comprising, in order from an object side thereof, a positive first lens group, a negative second lens group, a positive third lens group and a positive fourth lens group, wherein zooming is implemented by changing the spacing between the respective lens groups; upon received in a lens mount, said third lens group is shifted and positioned while its optical axis is tilted at an angle of ±45° with those of other lens groups or placed substantially horizontal; and at least one of lenses in said second lens group or said fourth lens group is configured such that a portion thereof proximate to said third lens group being received in the lens mount is cut away; with the satisfaction of the following condition (1):

$$0.3 < d \times (F_{nt}/f_t) < 3.0 \tag{1}$$

where d is a distance between the center point of axial thickness of said third lens group being received in the lens mount and the optical axis, $F_{nt}$ is an F-number at a telephoto end, and $f_t$ is a focal length at the telephoto end.

The advantages of, and the requirements for, the aforesaid arrangement are now explained.

The invention relies upon the arrangement which comprises, in order from its object side, the positive first lens group, the negative second lens group, the positive third lens group and the positive fourth lens group, and in which zooming is implemented by changing the spacing between the respective lens groups. Such arrangement enables the respective lens groups to have efficient zoom sharing, making the optical system compact because aberrational fluctuations during zooming are minimized, and the amounts of movement of the respective lens groups are prevented from growing large as well.

Further, upon received in the lens mount, the aforesaid third lens group is shifted and positioned while its axis is tilted at an angle of ±45° with those of other lens groups or placed substantially horizontal, and at least one of the lenses in the aforesaid second or fourth lens group is configured as if a portion (through which effective light rays do not pass) thereof proximate to the third lens group being received in the lens mount was cut away. It is thus possible to make effective use of space and, hence, achieve some considerable reductions in the size of a lens barrel and the size of a camera upon the lenses put away. However, cutting away that lens too much is not preferred because stray light (ghosts, flares) is likely to occur at the cut surface. For this reason, it is of vital importance to satisfy the aforesaid condition with respect to the shift amount, the F-number, and the focal length.

Falling short of the lower limit to this condition is not preferable because the stray light (ghosts, flares) is likely to occur at the cut surface, and there is interference in the range through which effective light rays travel. Exceeding the upper limit causes the amount of shift of the third lens group to grow large upon received in the lens mount, failing to make the lens barrel compact or achieve the object of the invention.

In addition, for the aforesaid invention it is more preferable to satisfy the following requirements solely or in combination.

It is preferable to satisfy the following conditions (2) and (3):

$$0.50 < R_2'/R_2 < 0.95 \tag{2}$$

$$0.50 < R_4'/R_4 < 0.95 \tag{3}$$

where $R_2$ is a length from a lens's effective surface end farthest off an optical axis position of the cut lens surface in the aforesaid second lens group to the optical axis position, $R_2'$ is a length from a lens's effective surface end nearest to the optical axis position of the cut lens surface in the aforesaid second lens group to the optical axis position, $R_4$ is a length from a lens's effective surface end farthest off an optical axis position of the cut lens surface in the aforesaid fourth lens group to the optical axis position, $R_4'$ is a length from a lens's effective surface end nearest to the optical axis position of the cut lens surface in the aforesaid fourth lens group to the optical axis position.

Exceeding the upper limit to condition (2) or (3) causes the amount of shift of the third lens group to grow large upon received in the lens mount, failing to make the lens barrel compact.

Falling short of the lower limit to condition (2) or (3) is not preferable because the cut surface of that lens grows large, making stray light (ghosts, flares) likely to occur there.

Preferably, the aforesaid second or fourth lens group includes light shield means adapted to shield off light reflected at the cut lens surface. The aforesaid cut lens surface is susceptible of ghosts, flares, etc. at the cut lens surface: if the light shield means is applied to the cut lens surface, it is then possible to prevent the occurrence of ghosts and flares. Instead of such light shield means, it is acceptable to make use of (black or other) coating material capable of absorbing light rays or apply a rough relief to the surface of the cut lens surface, thereby bringing reflectivity or the like down.

If the aforesaid second lens group includes on the object side a negative lens concave on its image side, it is then possible to offer a sensible tradeoff between the compactness of the first lens group and correction of various aberrations such as field curvature. If at least one positive lens is located more on the image side with respect to that negative lens and that positive lens is configured such that its portion proximate to the third lens group being received in the lens mount is cut away, there is then no interference between the second and the third lens group upon received in the lens mount, which contributes more to compactness.

If at least one positive lens is located in the aforesaid fourth lens group and its portion proximate to the third lens group being received in the lens mount is cut away, there is then no interference between the third and the fourth lens group upon received in the lens mount, which contributes more to compactness.

With respect to the power of the first group, it is preferable to satisfy the following condition (4).

$$0.2 < f_1/f_t < 0.86 \tag{4}$$

where $f_1$ is the focal length of the aforesaid first lens group, and $f_t$ is the focal length of the whole zoom lens system at the telephoto end.

Exceeding the upper limit to condition (4) causes the power of the first group to get too small or the full length of the whole zoom lens system to grow long, rendering it difficult to reduce the size of the lens barrel. Falling short of the lower limit to condition (4) causes the power to get too strong; spherical aberrations and coma occurring at the telephoto end get too much, rendering it difficult to make sure good optical performance.

With respect to the focal length of the second group, it is preferable to satisfy the following condition (5).

$$0.02 < |f_2/f_t| < 0.50 \tag{5}$$

where $f_2$ is the focal length of the aforesaid second lens group, and $f_t$ is the focal length of the whole zoom lens system at the telephoto end.

This condition is about the balance between size reductions and aberration capabilities. Exceeding the upper limit to condition (5) causes the refracting power of the second lens group to get too strong; so off-axis aberrations at the wide-angle end and spherical aberrations at the telephoto end are likely to occur more. Falling short of the lower limit to condition (4) causes the refracting power of the second lens group to get too weak; so the whole lens system is likely to get bulky.

With respect to the focal length of the third group, it is preferable to satisfy the following condition (6).

$$0.02 < f_3/f_t < 0.60 \tag{6}$$

where $f_3$ is the focal length of the aforesaid third group, and $f_t$ is the focal length of the whole zoom lens system at the telephoto end.

This is about the balance between size reductions and aberration capabilities. Falling short of the lower limit to condition (6) causes the refracting power of the third group to get too strong; so spherical aberrations and coma are likely to occur more all over the zoom range from the wide-angle end to the telephoto end. Exceeding the upper limit to condition (6) causes the refracting power of the third group to get too weak; so the whole lens system is likely to get bulky.

The zoom lens according to the invention may have another arrangement that includes an aperture stop and comprises four lens groups: in order from its object side, a positive first lens group, a negative second lens group, a positive third lens group and a positive fourth lens group. Upon zooming from the wide-angle end to the telephoto end, the first lens group moves such that it is positioned more on the object side at the telephoto end than at the wide-angle end; the second lens group moves; the third lens group moves such that it is positioned more on the object side at the telephoto end than at the wide-angle end; the fourth lens group moves; and the aperture stop moves. In that case, the first lens group may move toward the object side alone or move in a convex locus toward the object or image side; the second lens group may move toward the object side alone or in a convex locus toward the object or image side; the third lens group may move toward the object side alone or move in a convex locus toward the object side; and the fourth lens group may move such that it is positioned more on the object or image side at the telephoto end than at the wide-angle end, or it may move monotonously, or in a convex locus toward the object or image side.

The zoom lens according to the invention may have yet another arrangement that includes an aperture stop and comprises five lens groups: in order from its object side, a positive first lens group, a negative second lens group, a positive third lens group, a positive fourth lens group and a positive fifth lens group. Upon zooming from the wide-angle end to the telephoto end, the first lens group moves such that it is positioned more on the object side at the telephoto end than at the wide-angle end; the second lens group moves; the third lens group moves such that it is positioned more on the object side at the telephoto end than at the wide-angle end; the fourth lens group moves; the fifth lens group moves; and the aperture stop moves. In that case, the first lens group may just as well move toward the object side alone or in a convex locus toward the object or image side; the second lens group may just as well move toward the object side alone or in a convex locus toward the object or image side; the third lens group may just as well move toward the object side alone or in a convex locus toward the object side; and the fourth lens group may just as well move toward the object side alone or in a convex locus toward the object or image side. The fifth lens group may just as well move such that it is positioned more on the object side at the telephoto end than at the wide-angle end. It may just as well move monotonously, or in a convex locus toward the object or image side.

Preferably, the aperture stop and a shutter unit are located between the second lens group and the third lens group, and they move in unison with the third lens group during zooming. This enables the entrance pupil to be positioned nearer to the object side, and the exit pupil to be away from the image plane. The position where these components are located is also where the height of off-axis rays goes down: the shutter unit is prevented from getting bulky, and there is a decrease in the dead space for moving the aperture stop and shutter unit. Upon received in the lens mount, the aperture stop may just as well be shifted and positioned together with the third lens group. Alternatively, it may be not shifted on the optical axis apart from the third lens group.

By moving all the lens groups in this way, the zoom function can be effectively shared between the respective lens groups, and even a wide-angle, high-zoom arrangement can perform better. By the movement of the aperture stop, not only is it possible to improve performance by effective correction of chromatic aberration of magnification and distortion, but it is also possible to gain proper control of both the entrance pupil position and the exit pupil position. More specifically, it is possible to attain a sensible balance between the heights of off-axis light beams at the wide-angle end and the telephoto end: the outer diameter of the first lens group and the outer diameter of the lens group located nearest to the image side can be kept compact in a well-balanced state. Reducing the outer diameter of the first lens group at the wide-angle end in particular would lead to a reduction in the size of the zoom lens in the thickness direction. It is also possible to control the zoom lens such that there is a decrease in fluctuations of the exit pupil position during zooming: it is possible to maintain the angle of incidence of light rays on a CCD, CMOS or the like in a suitable range, thereby getting around shading at the corners of the screen so that the zoom lens can be used with an electronic imaging apparatus.

For the inventive zoom lens, it is preferable to satisfy the following condition (4)

$$4.0 < f_t/f_w < 40.0 \tag{7}$$

where $f_t$ is the focal length of the whole zoom lens system at the telephoto end, and $f_w$ is the focal length of the whole zoom lens system at the wide-angle end.

As the upper limit to condition (7) is exceeded, there is difficulty in making sure the inventive arrangement have sufficient optical performance. As the lower limit to condition (7) is not reached, the inventive arrangement can no longer make the most of its own merit of achieving size and cost reductions, because the object of the invention is accomplishable even with much simpler arrangements.

For the electronic imaging apparatus of the invention, the first lens group should preferably be as thin as possible in the proper range, because it can be slimmed down in the thickness direction upon received in the lens mount. It is also possible to lower the height of light rays incident on the zoom lens, leading to a decrease in the diametrical size. More specifically, it is preferable to satisfy the following condition (8).

$$0.40 < \Sigma d_{1G}/I_{mw} < 3.00 \tag{8}$$

where $\Sigma d_{1G}$ is the axial thickness of the aforesaid first group, and $I_{mw}$ is the maximum image height at the wide-angle end.

As the upper limit to condition (8) is exceeded, it is impossible to achieve sufficient reductions in the thickness and diameter of the lens barrel even upon received in the lens mount. As the lower limit to condition (8) is not reached, it is impossible to give sufficient refracting power to each of the lenses constituting the first lens group. Further, the axial thickness or edge thickness of the lens gets too small: it is difficult or impossible to process the lens.

For the inventive electronic imaging apparatus, it is also preferable to satisfy the following condition (9).

$$0.50 < I_{mw}/f_w < 1.00 \tag{9}$$

where $I_{mw}$ is the maximum image height at the wide-angle end, and $f_w$ is the focal length of the whole zoom lens system at the wide-angle end.

As the upper limit of condition (9) is exceeded, it is difficult to make sure the inventive arrangement performs optically well. As the lower limit of condition (9) is not reached, the inventive arrangement can no longer make the most of its own merit of achieving size and cost reductions, because the object of the invention is accomplishable even with much simpler arrangements.

For the inventive electronic imaging apparatus, it is further preferable to satisfy the following condition (10) with respect to the total length of the zoom lens.

$$5.0 < L_t/I_{mw} < 20.0 \tag{10}$$

where $L_t$ is the total length of the whole zoom lens system at the telephoto end, and $I_{mw}$ is the maximum image height at the wide-angle end.

As the upper limit to condition (10) is exceeded, the total length of the lens system grows too long, leading to difficulty in reducing the size of the lens barrel being received in the lens mount. As the lower limit to condition (10) is not reached, the powers of the respective groups get too strong, resulting in the amounts of various aberrations getting too large.

It is preferable to have an image transformation block where electric signals containing distortion resulting from the zoom lens are transformed into image signals corrected for that distortion. Allowance of distortion by the zoom lens contributes a lot more to reductions of the lenses count and size of the zoom lens.

More preferably, the respective conditions are reduced down as set out below.

$$0.4 < d(F_{nt}/f_t) < 2.0 \tag{1}$$

$$0.4 < d(F_{nt}/f_t) < 1.5 \tag{1}''$$

$$0.5 < d(F_{nt}/f_t) < 1.2 \tag{1}'''$$

$$0.55 < R_2'/R_2 < 0.90 \tag{2}$$

$$0.60 < R_2'/R_2 < 0.90 \tag{2}''$$

$$0.55 < R_4'/R_4 < 0.90 \tag{3}$$

$$0.60 < R_4'/R_4 < 0.90 \tag{3}''$$

$$0.25 < f_1/f_t < 0.80 \tag{4}$$

$$0.3 < f_1/f_t < 0.75 \tag{4}''$$

$$0.03 < |f_2/f_t| < 0.40 \quad (5)$$

$$0.04 < |f_2/f_t| < 0.30 \quad (5)''$$

$$0.03 < f_3/f_t < 0.40 \quad (6)$$

$$0.05 < f_3/f_t < 0.28 \quad (6)''$$

$$6.5 < f_t/f_w < 30.0 \quad (7)'$$

$$9.5 < f_t/f_w < 12.0 \quad (7)''$$

$$0.70 < d_{1G}/I_{mw} < 2.10 \quad (8)'$$

$$0.90 < d_{1G}/I_{mw} < 1.25 \quad (8)''$$

$$0.60 < I_{mw}/f_w < 0.95 \quad (9)'$$

$$0.70 < I_{mw}/f_w < 0.80 \quad (9)''$$

$$8.0 < L_t/I_{mw} < 18.0 \quad (10)$$

$$14.0 < L_t/I_{mw} < 17.0 \quad (10)''$$

Note here that only the upper or lower limit values of the respective conditions may be redefined as the new ones.

According to the invention as described above, there can be a less costly zoom lens optical system provided, which meets simultaneously the requirements for a downsized arrangement and a wide-angle/higher zoom ratio arrangement for cameras that satisfy users demands for making the taking area involved wider than ever before without detrimental to the ability of cameras to be carried around, is well fit for the slimming of the lens barrel upon received in the lens mount, enables the quality of taken images to be well maintained, and lends itself to electronic imaging devices such as CCDs or CMOSs.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

In the following examples that underlies the invention, there is a less costly zoom lens optical system provided, which, through such tweaks as described above, meet simultaneously the requirements for a downsized arrangement and a wide-angle/higher zoom ratio arrangement for cameras that satisfy users demands for making the taking area involved wider than ever before without detrimental to the ability of cameras to be carried around, enable the quality of taken images to be well maintained, and lend themselves to electronic imaging devices such as CCDs or CMOSs.

The following examples are each directed to a zoom lens of the type wherein lenses are let out at the startup of an imaging apparatus as well as an imaging apparatus incorporating the same. More exactly, Examples 1 to 6 each provide a zoom lens having higher optical performance and improved in terms of compactness. Throughout Examples 1 to 6, the effective imaging area is of constant rectangular shape in all zooming states. In the respective examples, the values for the specific conditions have been found at the time of focusing on an object point at infinity. Total Length is the axial distance from the entrance surface to the exit surface of the zoom lens plus a back focus as calculated on an air basis.

Figure 6:
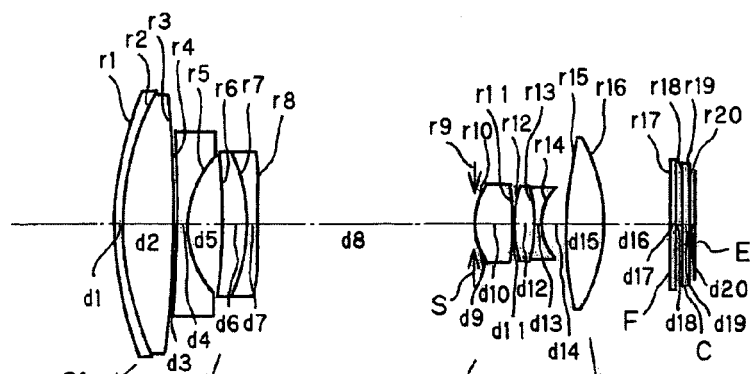
FIG. 6 is illustrative, as in FIG. 1, of Example 2 of the inventive zoom lens.
Figure 6:
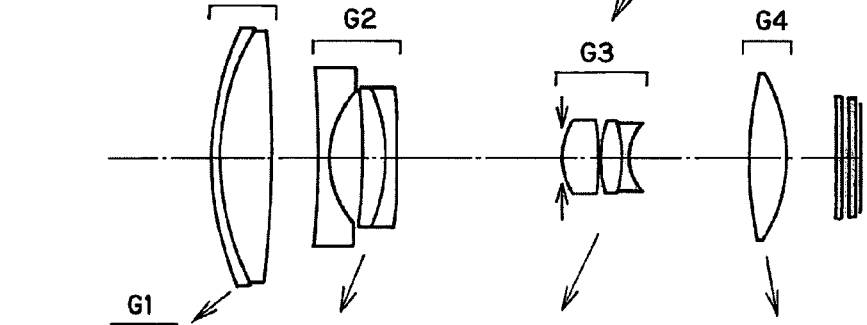
Figure 6:
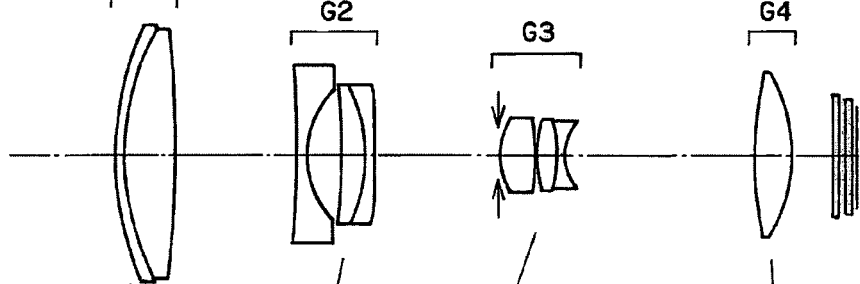
Figure 6:
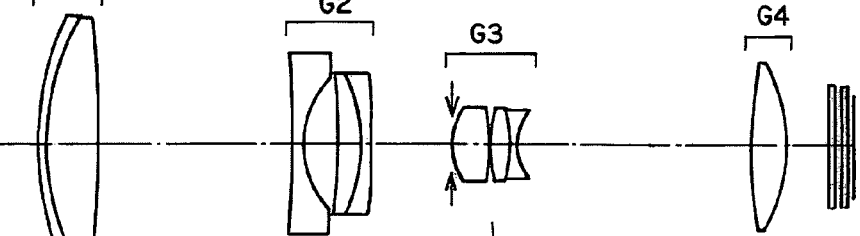
Figure 6:
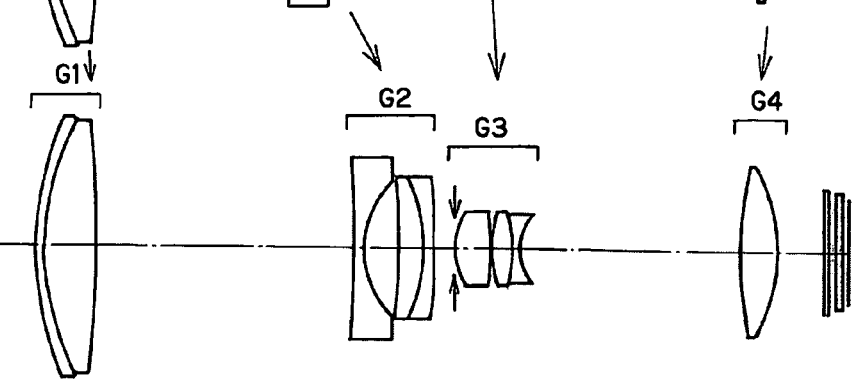

The zoom lens of the invention is now explained with reference to Examples 1 to 6. FIGS. 1, 6 and 9 are illustrative in lens arrangement section of Examples 1, 2 and 3 at the wide-angle end (a), the point of change (b) on the wide-angle side, in the intermediate state (c) where the first lens group is positioned nearest to the image side), at the point of change (d) on the telephoto side and at the telephoto end (e) upon focusing on an object point at infinity. Throughout FIGS. 1 to 3, G1 stands for the first lens group; G2 the second lens group; S an aperture stop; G3 the third lens group; G4 the fourth lens group; F an optical low-pass filter; C the cover glass of a CCD that is an electronic imaging device; and I the image plane of the CCD. Note here that for a near infrared sharp cut coating, for instance, it may be coated directly on the optical low-pass filter F or, alternatively, there may be another infrared cut absorption filter located.

It is here noted that drawings for Examples 4 to 6 are not attached hereto because they are similar in construction to Examples 1 to 3, respectively.

Example 1

Example 1 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 1.

Upon zooming from the wide-angle end to the telephoto end, the respective lens groups move as follows. Throughout Examples 1 to 3 here, note that the point of change in the direction of movement of the second G2 or the fourth lens group G4 from the wide-angle end to the intermediate state is defined as the point of change on the wide-angle side, and the point of change in the direction of movement of the second G2 or the fourth lens group G4 from the intermediate state to the telephoto end is defined as the point of change on the telephoto side.

The first lens group G1 moves toward the object side from the wide-angle end to the telephoto end.

From the wide-angle end to the point of change on the telephoto side, the second lens group G2 moves toward the object side while the spacing between the first lens group G1 and it grows wide and the spacing between it and the third lens group G3 becomes narrow and, from the wide-angle end to the telephoto end, the second lens group G2 moves in a convex locus toward the image side while the spacing between the first lens group G1 and it grows wide and the spacing between it and the third lens group G3 becomes narrow. At the telephoto end, the second lens group G2 is positioned a little more on the object side than at the wide-angle end, and a little more on the image side than at the point of change on the wide-angle side.

From the wide-angle end to the telephoto end, the aperture stop S and the third lens group G3 move in unison toward the object side while the spacing between the second lens group G2 and them becomes narrow and the spacing between them and the fourth lens group G4 grows wide.

From the wide-angle end to the telephoto end, the fourth lens group G4 moves toward the image side while the spacing between the third lens group G3 and it grows wide.

In order from the object side, the first lens group G1 is made up of a cemented lens of a negative meniscus lens and a double-convex positive lens; the second lens group G2 is made up of a double-concave negative lens and a cemented lens of a double-convex positive lens and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Seven aspheric surfaces are used: one at the surface nearest to the image side of the cemented lens in the first lens group G1; two at both surfaces of the double-concave negative lens in the second lens group G2, one at the surface nearest to the image side of the cemented lens in the second lens group G2, two at both surfaces of the double-convex positive lens in the third lens group G3; and one at the image side-surface of the double-convex positive lens in the fourth lens group G4.

How the zoom lens of Example 1 is received in the lens mount is now explained.

Figure 1A:
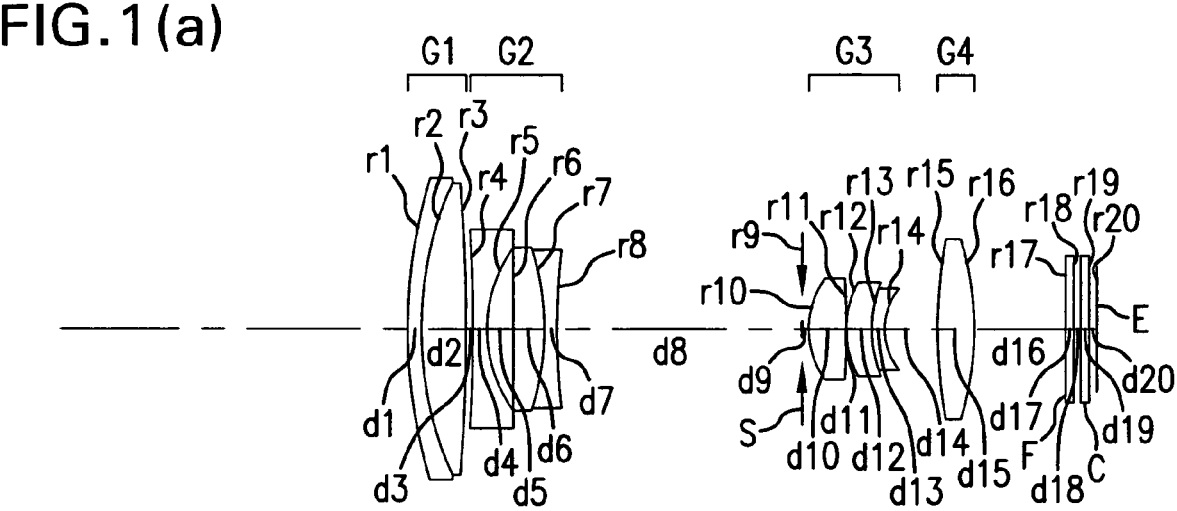
FIG. 1 is illustrative in lens arrangement section of Example 1 of the inventive zoom lens at the wide-angle end (a), at a point of change (b) on the wide-angle side, in an intermediate state (c), at a point of change (d) on the telephoto side and at the telephoto end (e) upon focusing on an object point at infinity.
Figure 1B:
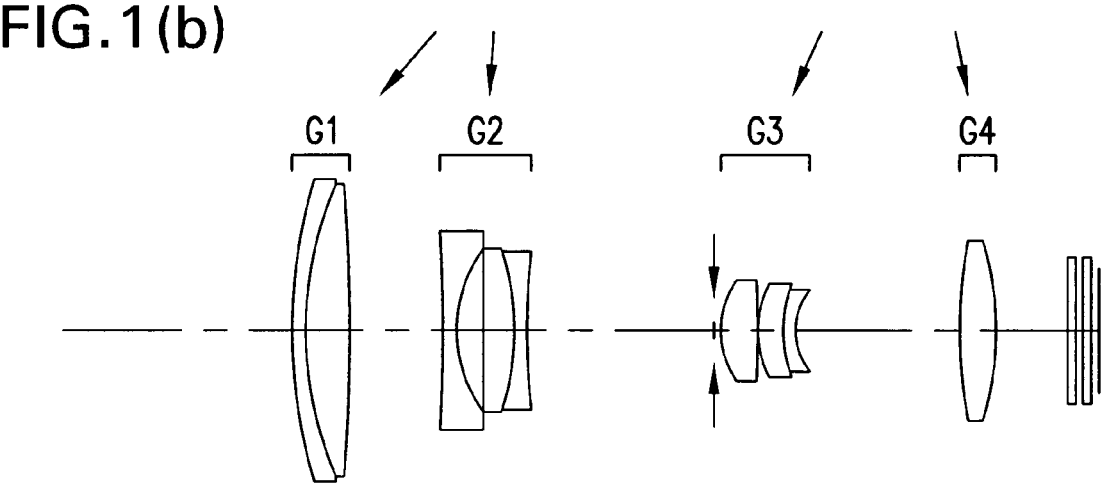
Figure 1C:
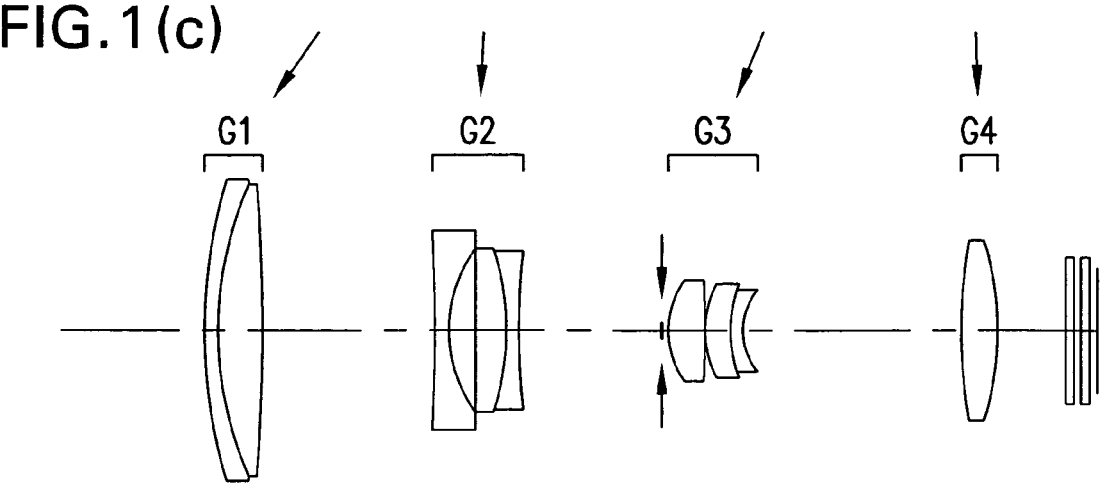
Figure 1D:
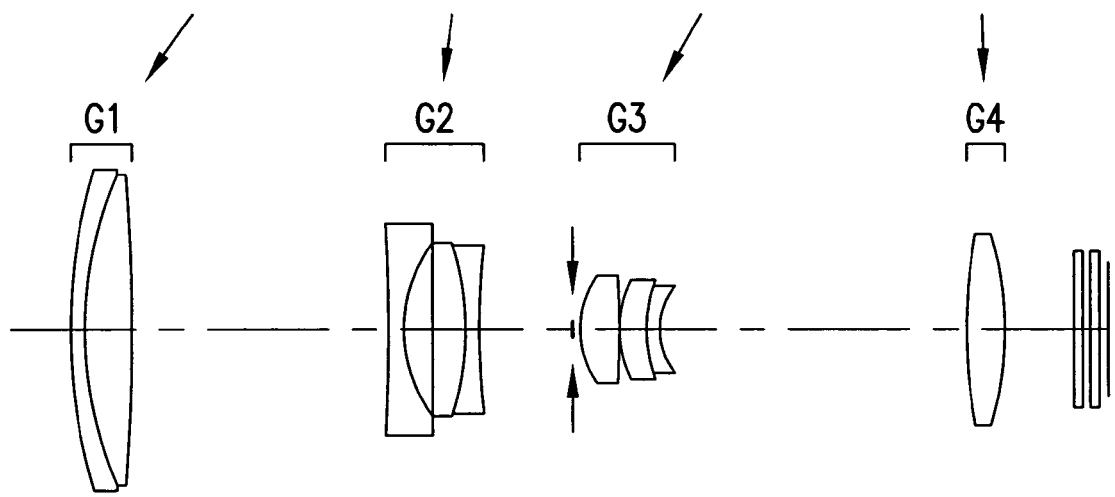
Figure 1E:
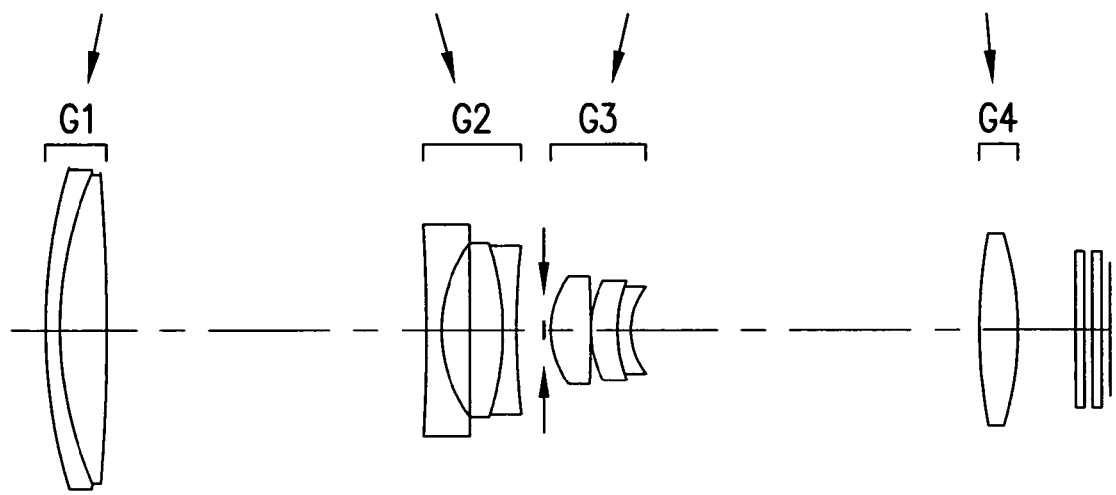
Figure 2:
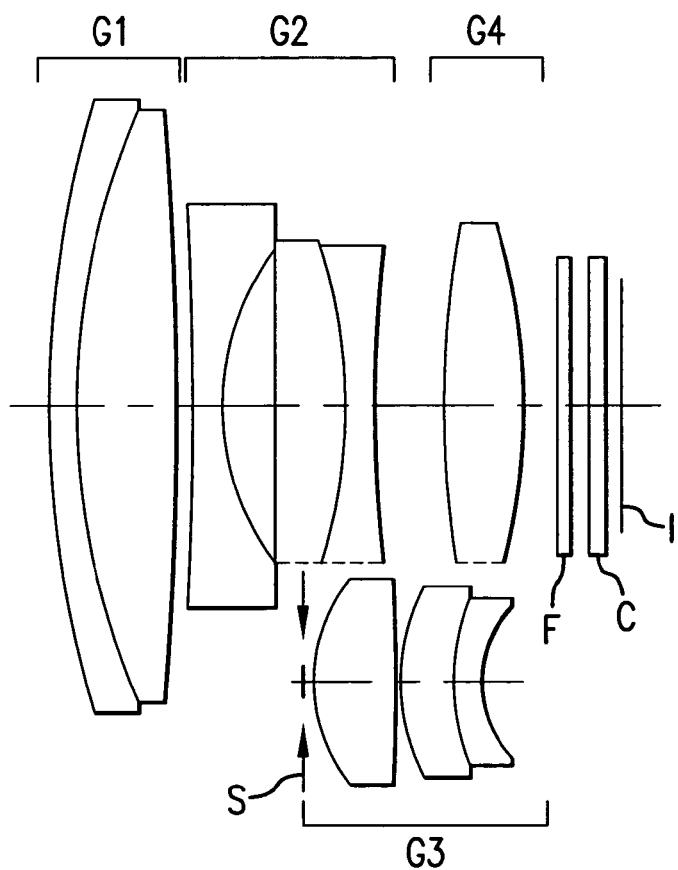
FIG. 2 is illustrative of Example 1 of the inventive zoom lens being received in the lens mount.

FIG. 2 is illustrative of a collapsible mount type 1 for the zoom lens of Example 1 where the aperture stop S and the third lens group G3 are received together in the lens mount and some lenses in the second G2, and the fourth lens group G4 are partly cut away.

The collapsible mount type 1 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away.

Such arrangement enables space to be so effectively used that the sizes of the lens barrel and camera with the lenses received in the lens mount can considerably be diminished.

Figure 3:
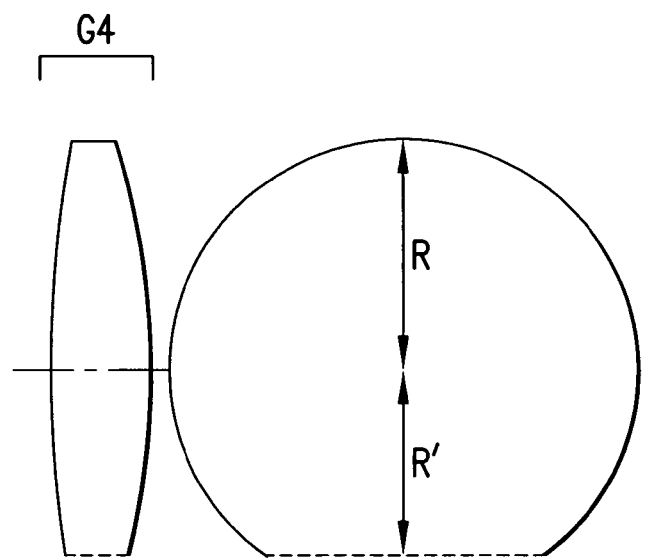
FIG. 3 is illustrative of a partly cut away lens in Example 1 of the inventive zoom lens.

FIG. 3 is illustrative of the shape of the cut lens in the fourth lens group G4. As indicated by a dotted line, a portion of that lens proximate to the third lens group G3 being received in the lens mount is cut away, with R' shorter than the lens diameter R.

Figure 4:
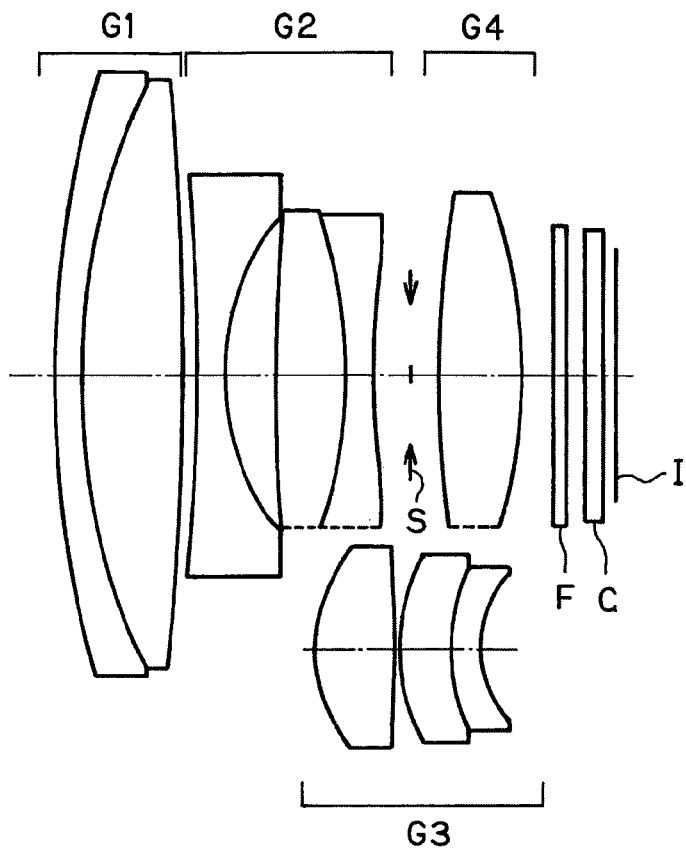
FIG. 4 is illustrative of Example 1 of the inventive zoom lens being received in the lens mount.

FIG. 4 is illustrative of a collapsible mount type 2 for the zoom lens of Example 1 where only the third lens group G3 except the aperture stop S is received in the lens mount, and some lenses in the second G2, and the fourth lens group G4 are partly cut away.

The collapsible mount type 2 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away. Such arrangement enables space to be so effectively used that the sizes of the lens barrel and camera with the lenses received in the lens mount can considerably be diminished.

Figure 5:
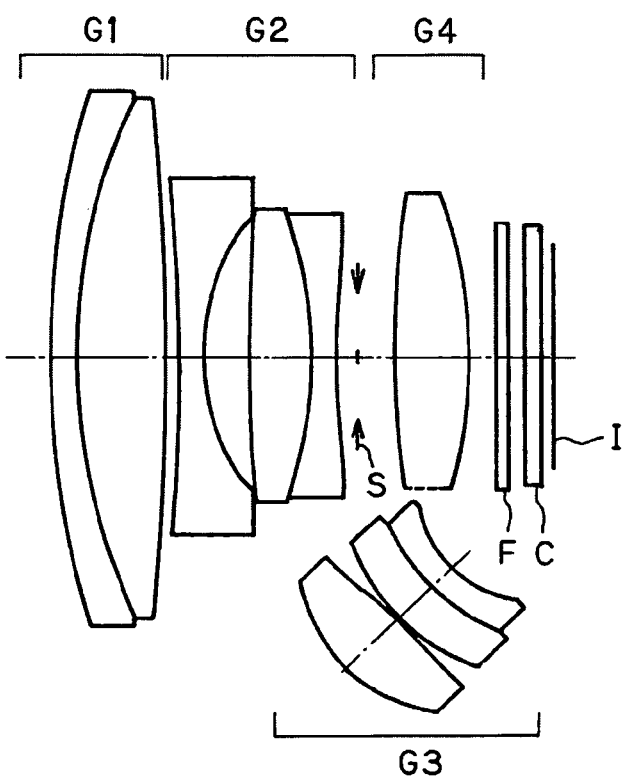
FIG. 5 is illustrative of Example 1 of the inventive zoom lens being received in the lens mount.

FIG. 5 is illustrative of a collapsible mount type 3 for the zoom lens of Example 1 where only the third lens group G3 except the aperture stop S is received in the lens mount, and the lens in the fourth lens group G4 is partly cut away.

The collapsible mount type 3 is designed such that upon received in the lens mount, the third lens group G3 and other lens groups G1, G2 and G4 are shifted and positioned while their optical axes are tilted at ±45° and a portion (through which effective light rays do not pass) of the lens in the fourth lens group G4 proximate to the third lens group G3 being received in the lens mount is cut away. Such arrangement enables space to be so effectively used that the sizes of the lens barrel and camera with the lenses received in the lens mount can considerably be diminished.

Example 2

Example 2 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 6.

Upon zooming from the wide-angle end to the telephoto end, the respective lens groups move as follows.

The first lens group G1 moves toward the object side from the wide-angle end to the telephoto end.

From the wide-angle end to the point of change on the telephoto side, the second lens group G2 moves toward the object side while the spacing between the first lens group G1 and it grows wide and the spacing between it and the third lens group G3 becomes narrow. From the point of change on the telephoto side to the telephoto end, the second lens group G2 moves toward the image side while the spacing between the first lens group G1 and it grows wide and the spacing between it and the third lens group G3 become narrow, and from the wide-angle end to the telephoto end, the second lens group G2 moves in a convex locus toward the object side. At the telephoto end, the second lens group G2 is positioned more on the image side than at the wide-angle end.

The aperture stop S and the third lens group G3 move toward the object side while the spacing between the second lens group G2 and them becomes narrow and the spacing between them and the fourth lens group G4 grows wide. From the point of change on the telephoto end to the telephoto end, they move toward the image side while the spacing between the second lens group G2 and them becomes narrow and the spacing between them and the fourth lens group G4 becomes narrow and, from the wide-angle end to the telephoto end, they move in a convex locus toward the object side. At the telephoto end, they are positioned a little more on the image side than at the point of change on the telephoto side and more on the object side than in the intermediate state.

From the wide-angle end to the intermediate state, the fourth lens group G4 moves to the image side while the spacing between the third lens group G3 and it grows wide; from the intermediate state to the point of change on the telephoto side, it moves toward the object side while the spacing between the third lens group G3 and it grows wide; from the point of change on the telephoto side to the telephoto end, it moves toward the object side while the spacing between the third lens group G3 and it becomes narrow; and from the wide-angle end to the telephoto end, it moves in a convex locus toward the image side.

In order from the object side, the first lens group G1 is made up of a cemented lens of a negative meniscus lens and a double-convex positive lens; the second lens group G2 is made up of a double-concave negative lens and a cemented lens of a positive meniscus lens convex on its object side and a double-concave negative lens; the third lens group G3 is made up of a double-convex positive lens and a cemented lens of a double-convex positive lens and a double-concave negative lens; and the fourth lens group G4 is made up of one double-convex positive lens.

Eight aspheric surfaces are used: one at the surface nearest to the image side of the cemented lens in the first lens group G1; two at both surfaces of the double-concave negative lens in the second lens group G2, one at the surface nearest to the image side of the cemented lens in the second lens group G2, two at both surfaces of the double-convex positive lens in the third lens group G3; and two at both surfaces of the double-convex positive lens in the fourth lens group G4.

How the zoom lens of Example 2 is received in the lens mount is now explained.

Figure 7:
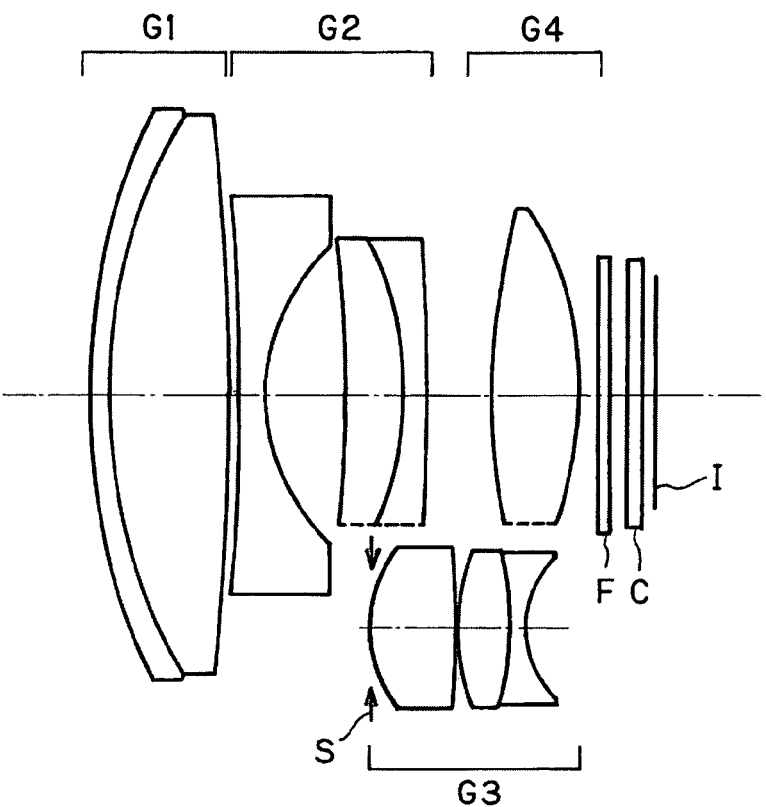
FIG. 7 is illustrative of Example 1 of the inventive zoom lens being received in the lens mount.

FIG. 7 is illustrative of a collapsible mount type 1 for the zoom lens of Example 2 where the aperture stop S and the third lens group G3 are received together in the lens mount and some lenses in the second G2, and the fourth lens group G4 are partly cut away.

The collapsible mount type 1 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away.

Such arrangement enables space to be so effectively used that the sizes of the lens barrel and camera with the lenses received in the lens mount can considerably be diminished.

Figure 8:
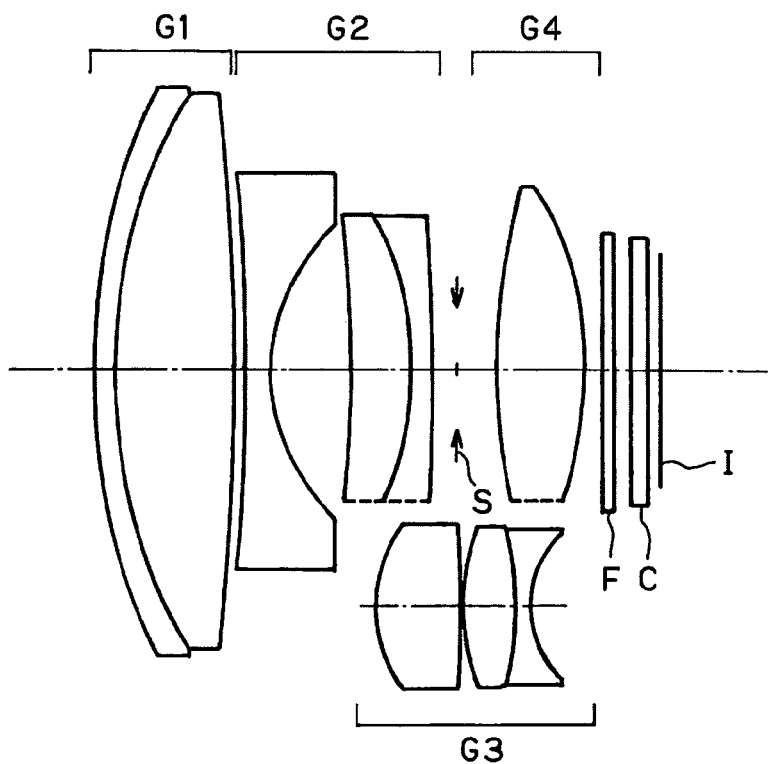
FIG. 8 is illustrative of Example 1 of the inventive zoom lens being received in the lens mount.
Figure 9A:
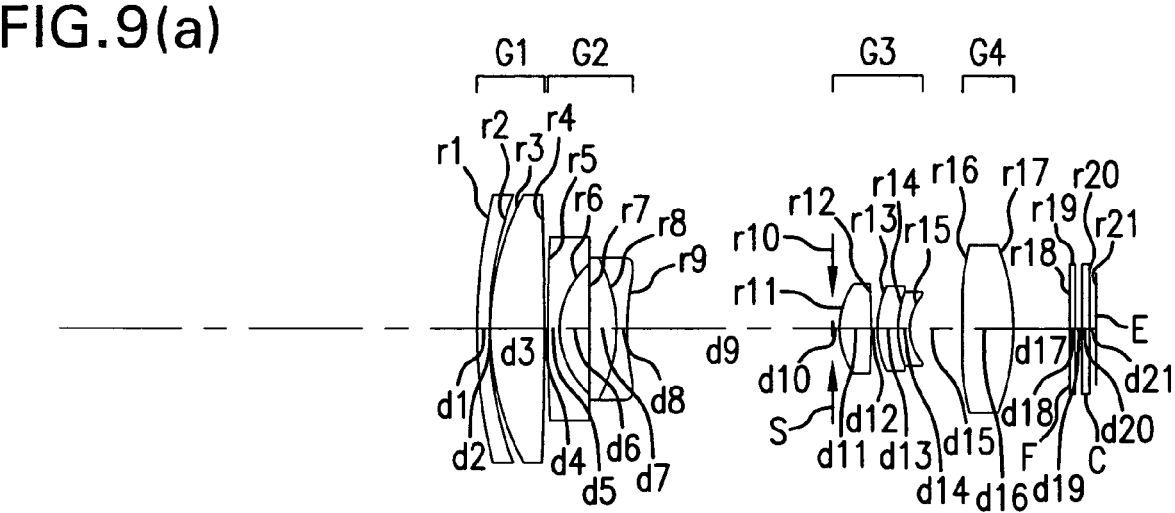
FIG. 9 is illustrative, as in FIG. 1, of Example 3 of the inventive zoom lens.
Figure 9B:
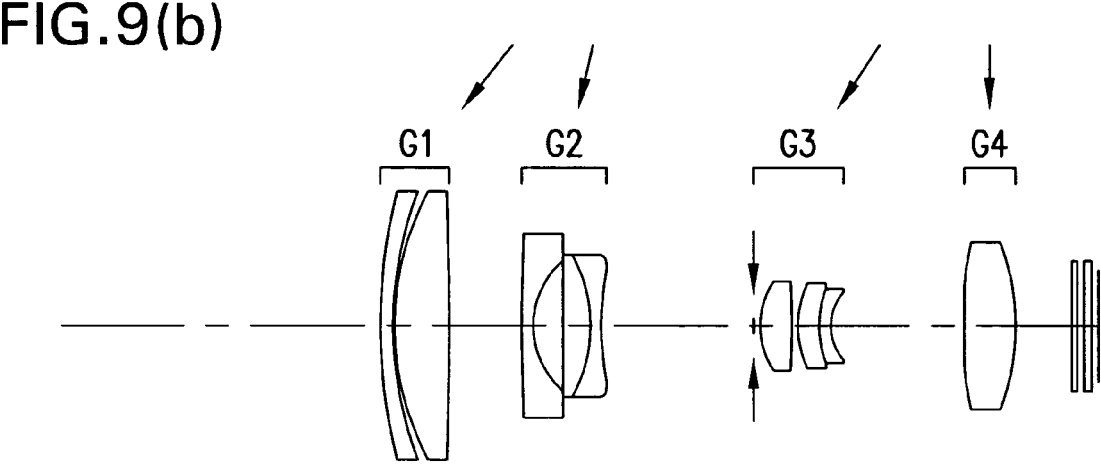
Figure 9C:
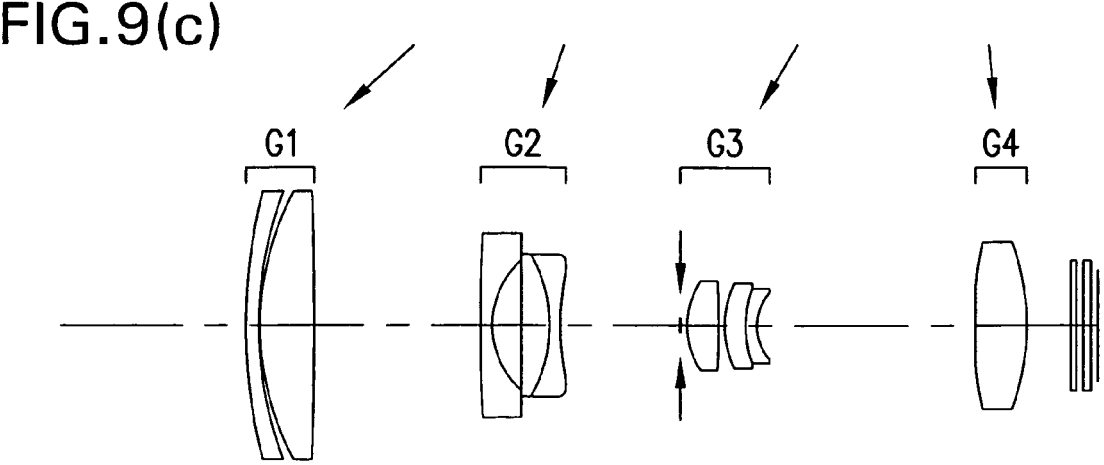
Figure 9D:
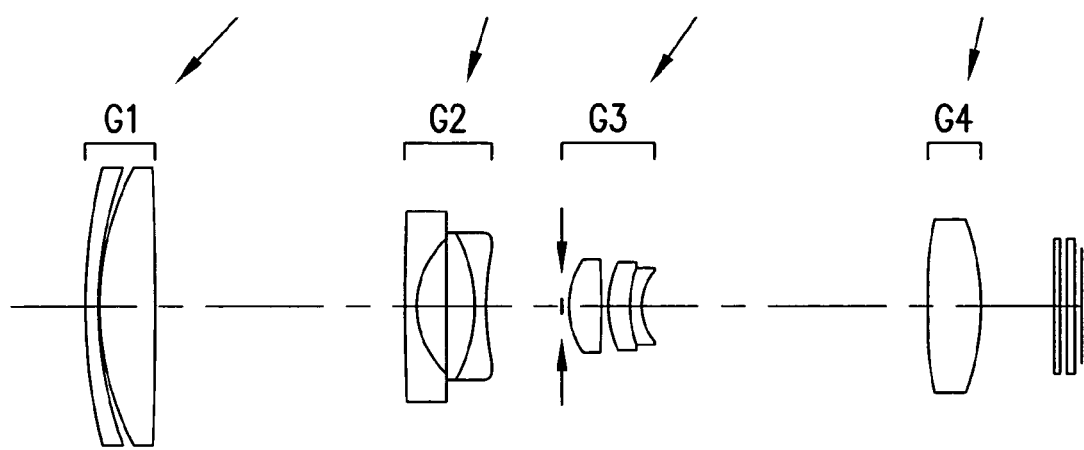
Figure 9E:
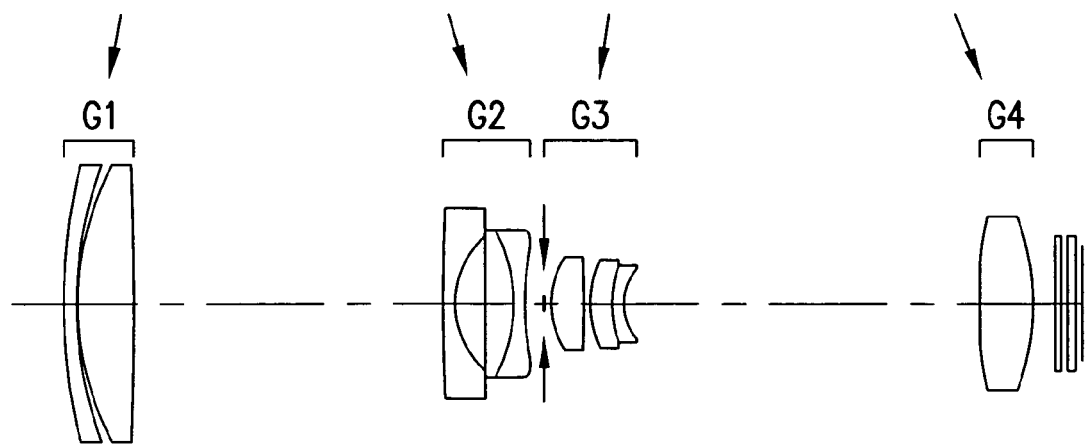

FIG. 8 is illustrative of a collapsible mount type 2 for the zoom lens of Example 1 where only the third lens group G3 except the aperture stop S is received in the lens mount, and some lenses in the second G2, and the fourth lens group G4 are partly cut away.

The collapsible mount type 2 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away. Such arrangement enables space to be so effectively used that the sizes of the lens barrel and camera with the lenses received in the lens mount can considerably be diminished.

Example 3

Example 3 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 9.

Upon zooming from the wide-angle end to the telephoto end, the respective lens groups move as follows.

The first lens group G1 moves toward the object side from the wide-angle end to the telephoto end.

From the wide-angle end to the point of change on the telephoto side, the second lens group G2 moves toward the object side while the spacing between the first lens group G1 and it grows wide and the spacing between it and the third lens group G3 becomes narrow. From the point of change on the telephoto end to the telephoto end, the second lens group G2 moves toward the image side while the spacing between the first lens group G1 and it grows wide and the spacing between it and the third lens group G3 becomes narrow, and from the wide-angle end to the telephoto end, the second lens group G2 moves in a convex locus toward the object side. At the telephoto end, the second lens group G2 is positioned a little more on the object side than at the point of change on the wide-angle side, and a little more on the image side than in the intermediate state.

From the wide-angle end to the telephoto end, the aperture stop S and the third lens group G3 move in unison toward the object side while the spacing between the second lens group G2 and them becomes narrow and the spacing between them and the fourth lens group G4 grows wide.

From the wide-angle end to the intermediate state, the fourth lens group G4 moves to the image side while the spacing between the third lens group G3 and it grows wide; from the intermediate state to the point of change on the telephoto side, it moves toward the object side while the spacing between the third lens group G3 and it grows wide; and from the point of change on the telephoto side to the telephoto end, it moves toward the image side while the spacing between the third lens group G3 and it grows wide.

In order from the object side, the first lens group G1 is made up of a negative meniscus lens convex on its object side and a double-convex positive lens; the second lens group G2 is made up of a negative meniscus lens convex on its object side and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the image-side surface of the double-convex positive lens in the first lens group G1; two at both surfaces of the negative meniscus lens in the second lens group G2, one at the surface nearest to the image side of the cemented lens in the second lens group G2, two at both surfaces of the double-convex positive lens in the third lens group G3; and one at the image-side surface of the double-convex positive lens in the fourth lens group G4.

How the zoom lens of Example 3 is received in the lens mount is now explained.

Figure 10:
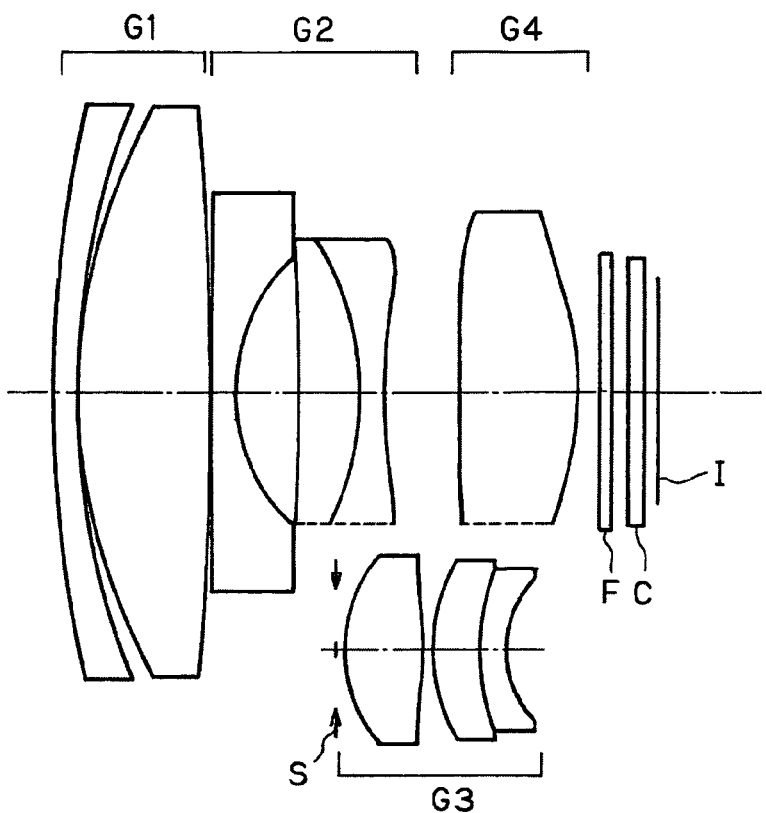
FIG. 10 is illustrative of Example 1 of the inventive zoom lens being received in the lens mount.

FIG. 10 is illustrative of a collapsible mount type 1 for the zoom lens of Example 3 where the aperture stop S and the third lens group G3 are received together in the lens mount and some lenses in the second G2, and the fourth lens group G4 are partly cut away.

The collapsible mount type 1 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away.

Such arrangement enables space to be so effectively used that the sizes of the lens barrel and camera with the lenses received in the lens mount can considerably be diminished.

Figure 11:
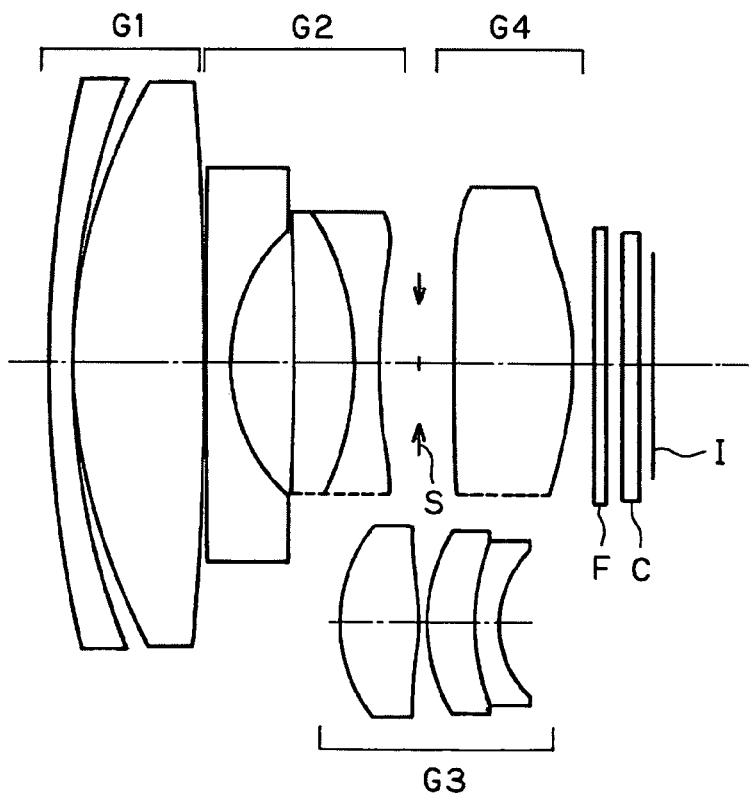
FIG. 11 is illustrative of Example 1 of the inventive zoom lens being received in the lens mount.
Figure 12:
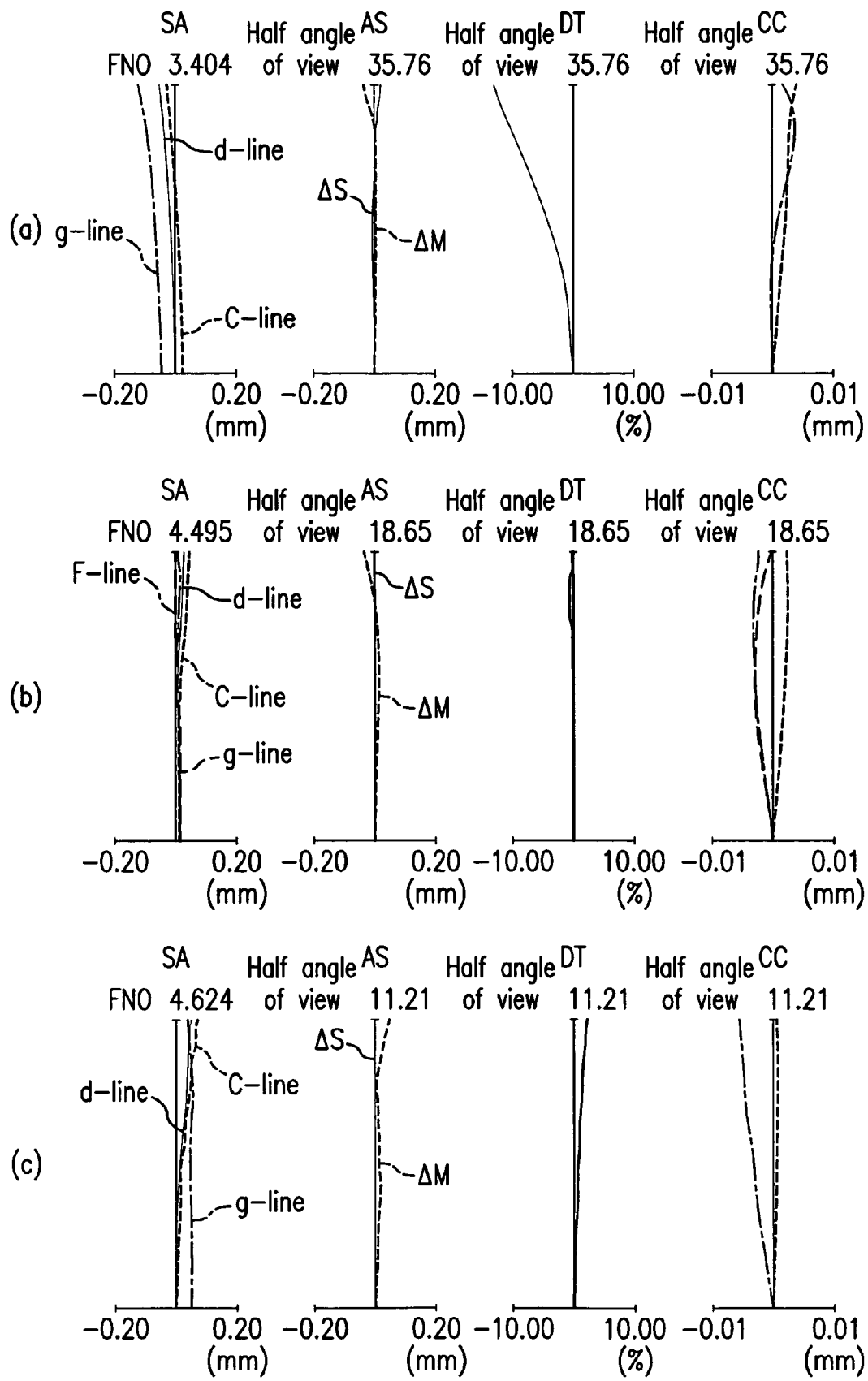
FIG. 12 is an aberration diagram for Example 1 upon focusing on an object point at infinity.
Figure 13:
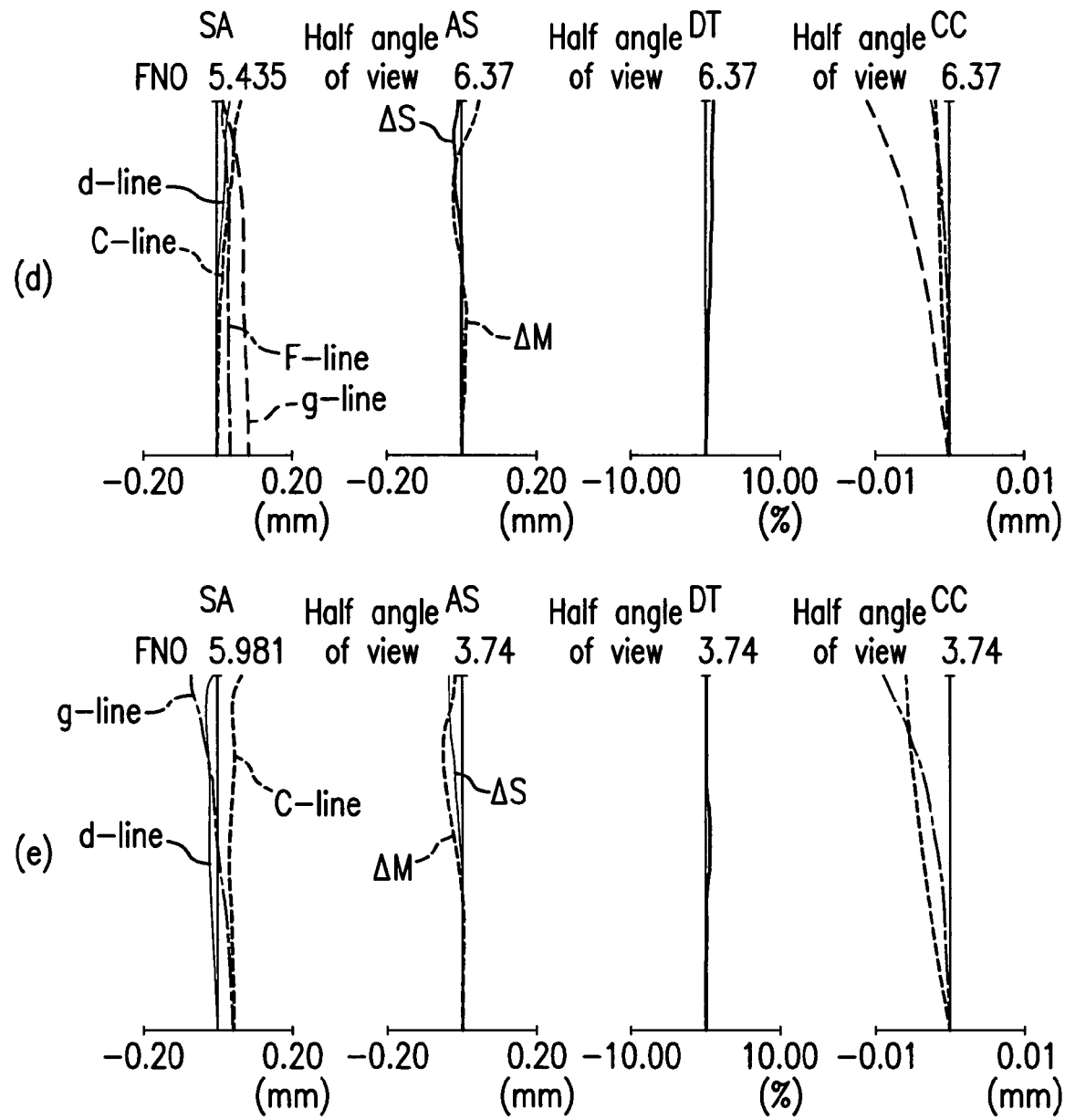
FIG. 13 is an aberration diagram for Example 1 upon focusing on an object point at infinity.
Figure 14:
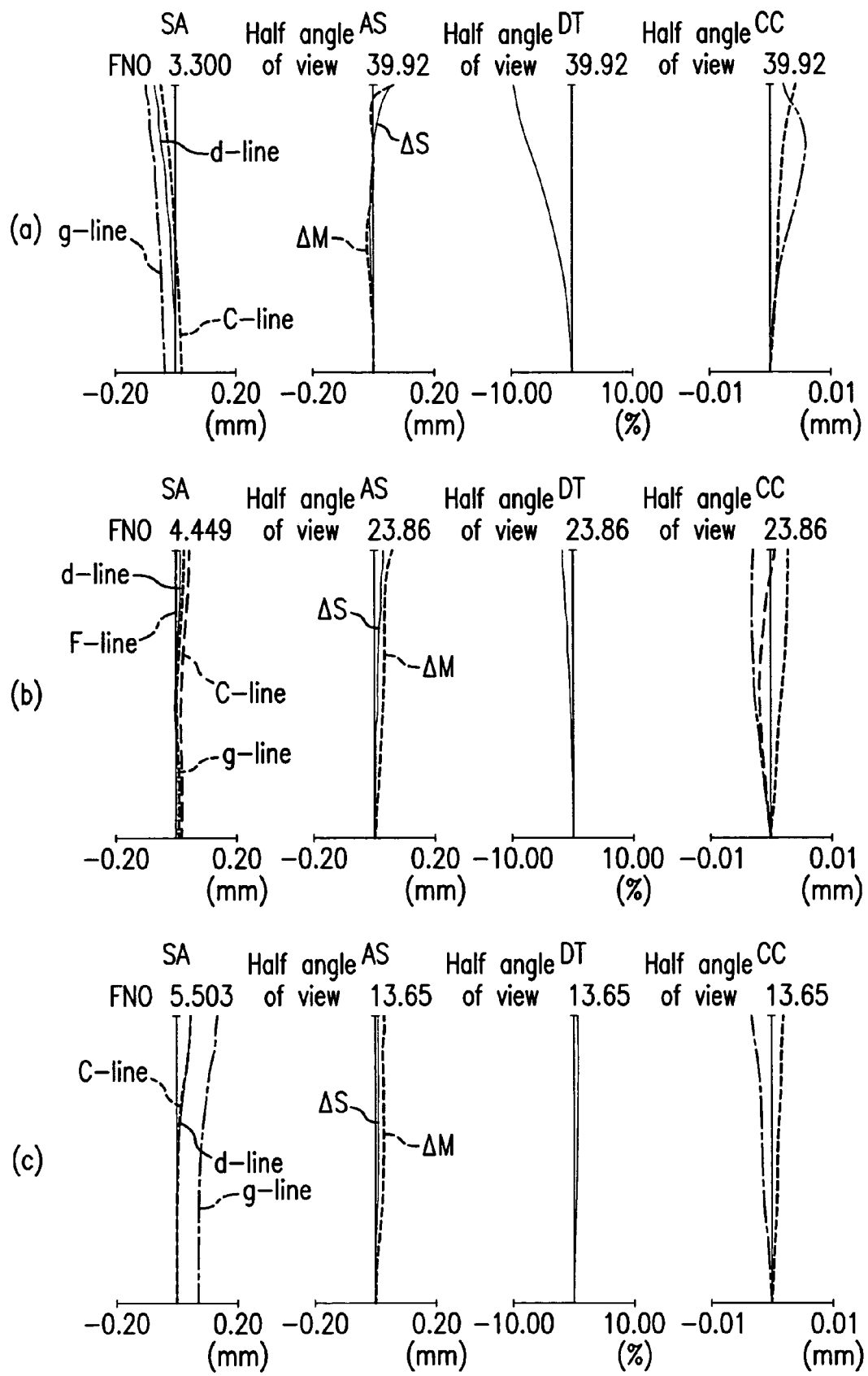
FIG. 14 is an aberration diagram for Example 2 upon focusing on an object point at infinity.
Figure 15:
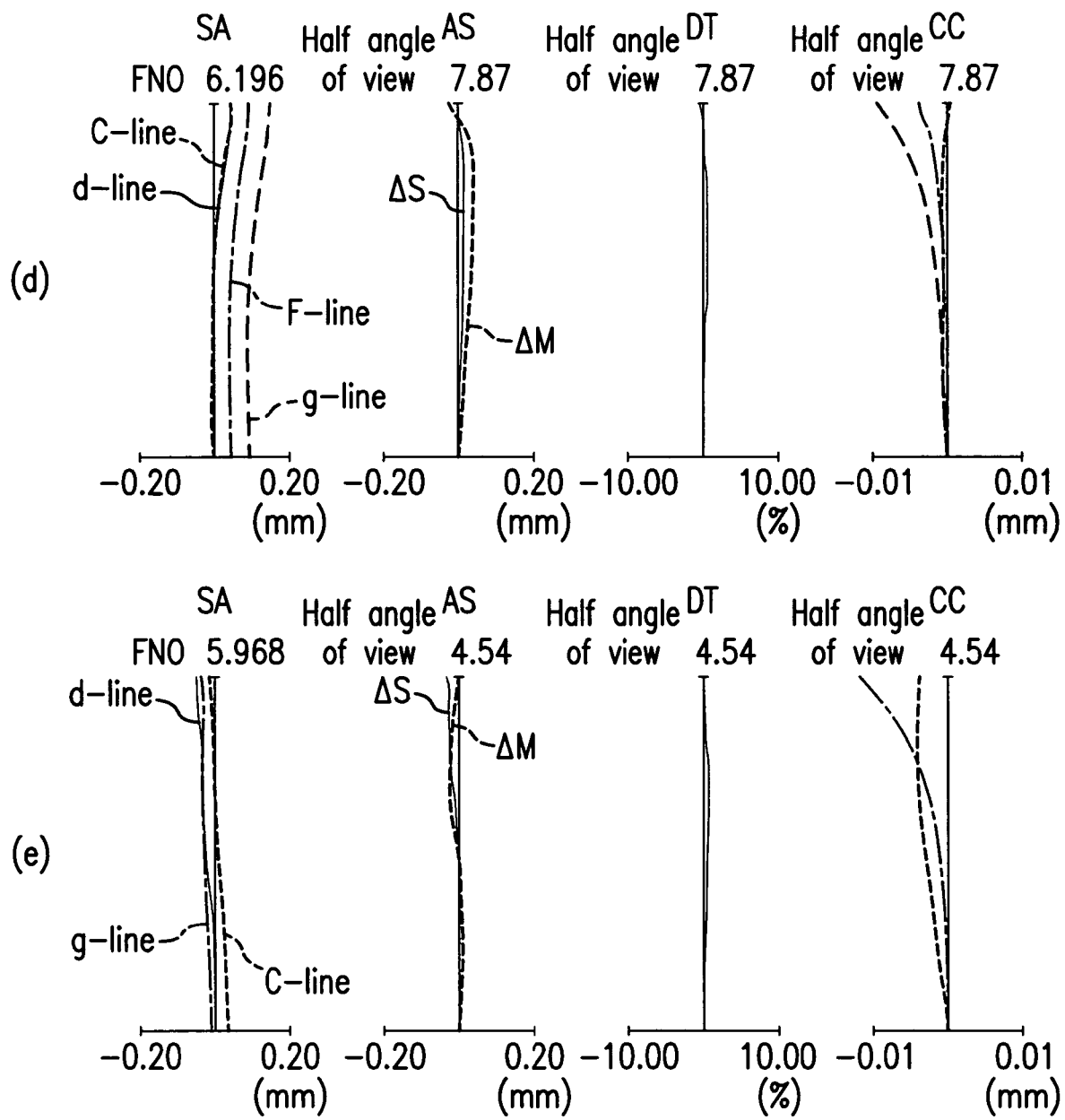
FIG. 15 is an aberration diagram for Example 2 upon focusing on an object point at infinity.
Figure 16:
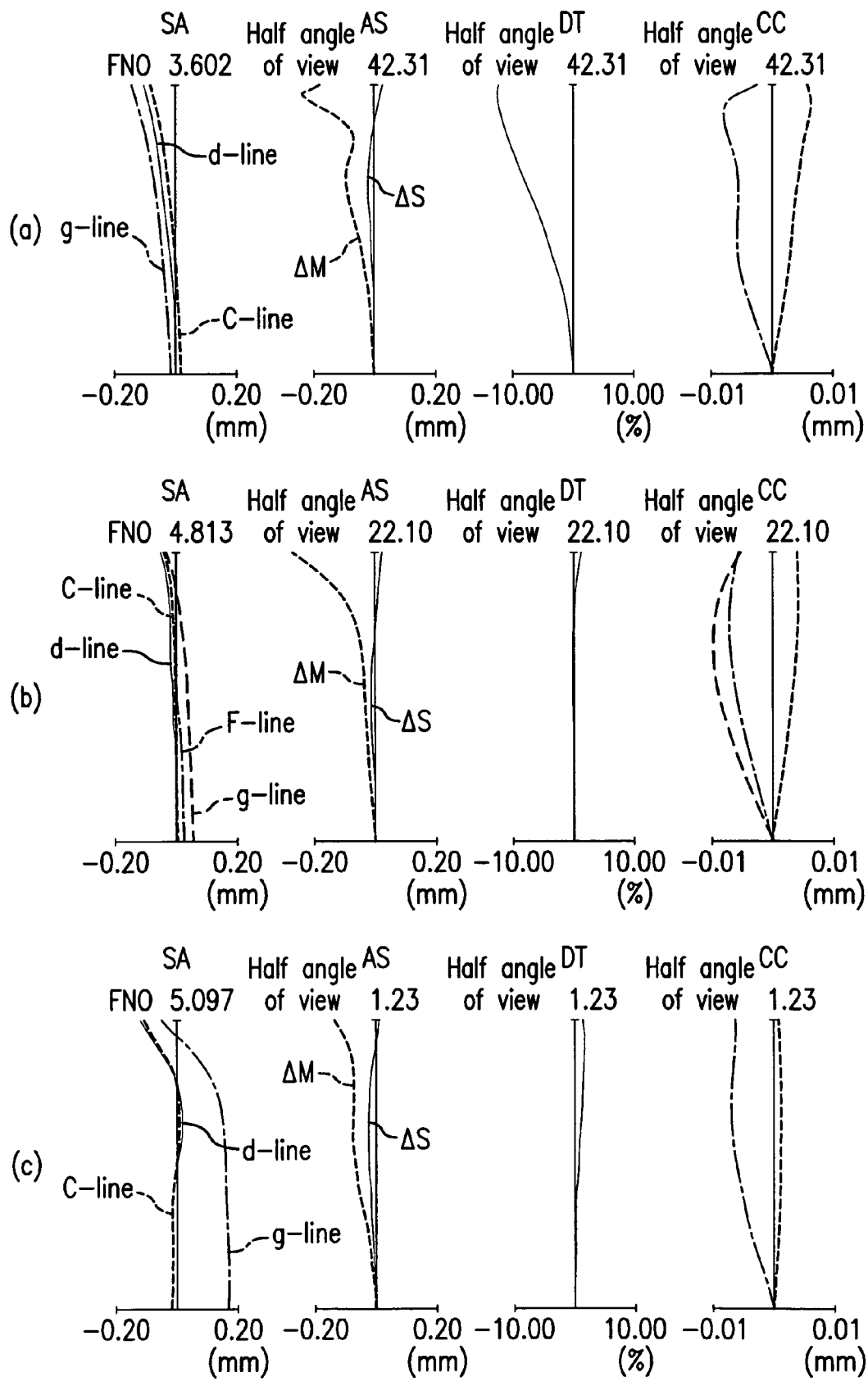
FIG. 16 is an aberration diagram for Example 3 upon focusing on an object point at infinity.
Figure 17:
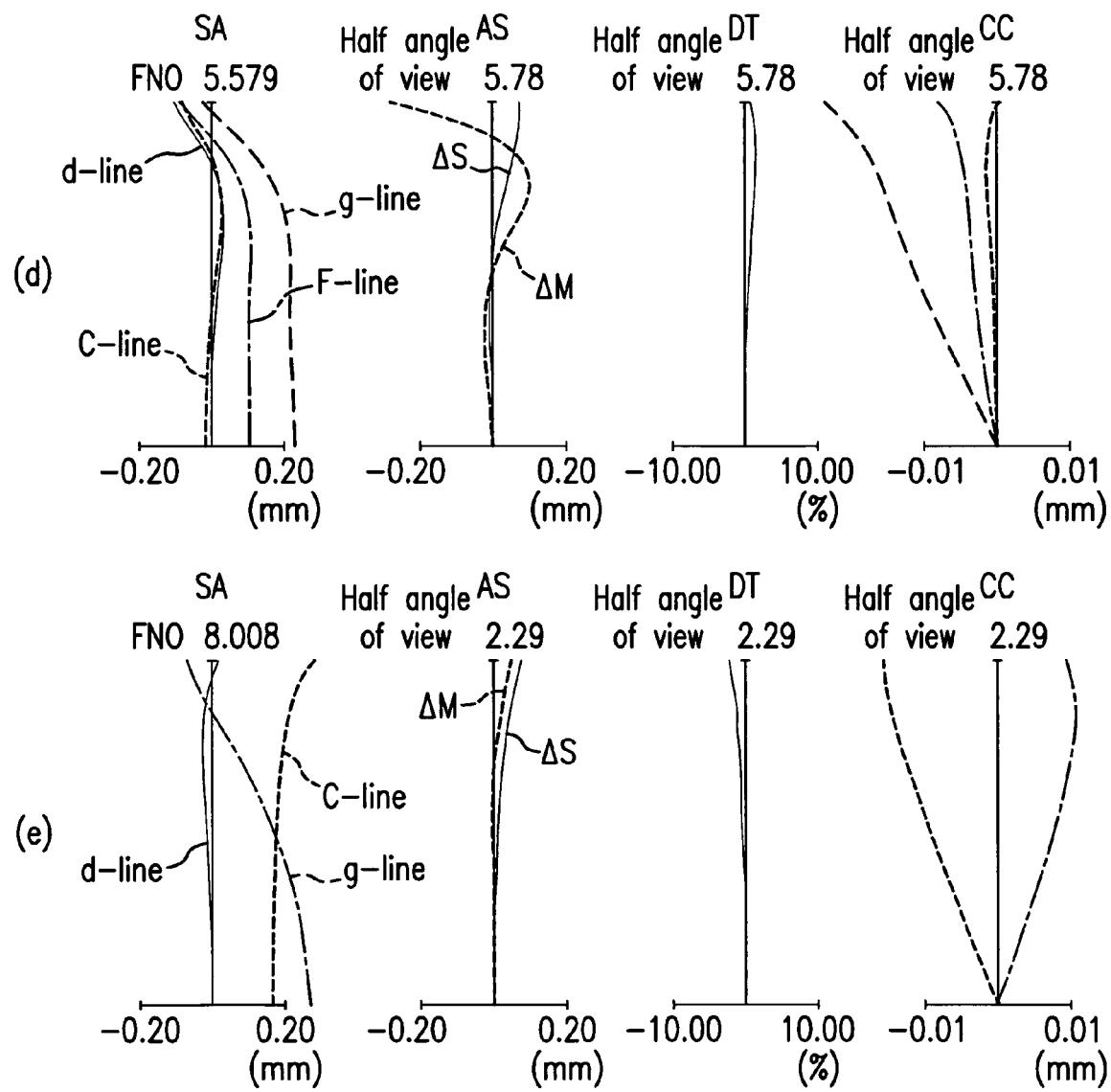
FIG. 17 is an aberration diagram for Example 3 upon focusing on an object point at infinity.

FIG. 11 is illustrative of a collapsible mount type 2 for the zoom lens of Example 3 where only the third lens group G3 except the aperture stop S is received in the lens mount, and some lenses in the second G2, and the fourth lens group G4 are partly cut away.

The collapsible mount type 2 is designed such that upon received in the lens mount, the third lens group G3 and other lens groups G1, G2 and G4 are shifted and positioned while their optical axes lie horizontal, and portions (through which effective light rays do not pass) of the lenses in the second G2, and the fourth lens group G4 proximate to the third lens group G3 being received in the lens mount are cut away. Such arrangement enables space to be so effectively used that the sizes of the lens-barrel and camera with the lenses received in the lens mount can considerably be diminished.

In Examples 4, 5 and 6, the zoom lenses of Examples 1, 2 and 3 are each used with an imaging apparatus for electrical correction of distortion, wherein there is the shape of an effective imaging area changing during zooming. For this reason, the image height and angle of view vary for each example in zoom states.

In Examples 4, 5 and 6, images are recorded and displayed with electrical correction of barrel distortion occurring on the wide-angle side. Each zoom lens here has barrel distortion produced at the wide-angle end on a rectangular photoelectric transformation plane. On the other hand, distortion is kept from occurring near the intermediate focal length or at the telephoto end. For electrical correction of distortion, the effective imaging area is configured in a barrel shape at the wide-angle end and a rectangular shape near the intermediate focal length or at the telephoto end. And the preset effective imaging area is transformed by image processing into rectangular image information having reduced distortion.

An image height IHw at the wide-angle end is less than an image IHs in the intermediate focal length state or an image height IHt at the telephoto end.

In Examples 4, 5 and 6, the effective imaging area is preset such that at the wide-angle end, the length of the photoelectric transformation plane in the short-side direction is the same as the length of the effective imaging area in the short-side direction so that there is about −3% distortion remaining after image processing but, of course, rectangularly transformed images may be recorded and reproduced on the effective imaging area defined by a smaller barrel area.

Set out below are the numerical data about the zoom lens of each example.

With regard to Examples 4, 5 and 6 similar in construction to Examples 1, 2 and 3, there are only zoom lens data indicated.

Symbols mentioned hereinafter but not hereinbefore have the following meanings:

r is the radius of curvature of each lens surface,
d is the thickness or spacing across each lens,
nd is the d-line refractive index of each lens,
νd is the d-line Abbe constant of each lens,
K is the conic coefficient,
A4, A6, A8, and A10 is the aspheric coefficients, and
E±n is ×10$^{\pm n}$.

Note here that each aspheric shape is given by the following equation using each aspheric coefficient in each example.

$$Z=(Y^2/r)/[1+\{1-(K+1)\cdot(Y/r)^2\}^{1/2}]+A4\times Y^4+A6\times\times Y^6+A8\times Y^8+A10\times Y^{10}$$

Here Z is the coordinates in the optical axis direction, and Y is the coordinates in a direction vertical to the optical axis.

| Numerical Example 1 Unit mm | | | | |
|---|---|---|---|---|
| Surface data | | | | |
| Surface No. | r | d | nd | νd |
| 1 | 34.512 | 0.80 | 1.92286 | 18.90 |
| 2 | 22.705 | 2.85 | 1.77250 | 49.60 |
| 3 (Aspheric surface) | −92.631 | Variable | | |
| 4 (Aspheric surface) | −65.740 | 0.80 | 1.83481 | 42.71 |
| 5 (Aspheric surface) | 9.778 | 1.44 | | |
| 6 | 75.378 | 1.96 | 1.94595 | 17.98 |
| 7 | −17.222 | 0.80 | 1.83481 | 42.71 |
| 8 (Aspheric surface) | 21.226 | Variable | | |
| 9 (Stop) | ∞ | 0.30 | | |
| 10 (Aspheric surface) | 5.101 | 2.31 | 1.49700 | 81.54 |
| 11 (Aspheric surface) | −20.661 | 0.10 | | |
| 12 | 6.489 | 1.51 | 1.77250 | 49.60 |
| 13 | 7.268 | 0.80 | 2.00068 | 25.47 |
| 14 | 3.697 | Variable | | |
| 15 | 41.600 | 2.32 | 1.74330 | 49.33 |
| 16 (Aspheric surface) | −18.336 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.40 | | |
| Image plane | ∞ | | | |
| Aspheric surface data | | | | |

3$^{rd}$ surface

K = 0.000, A4 = 5.66390E−06, A6 = 2.45442E−09,
A8 = −5.20696E−11

4$^{th}$ surface

K = 0.000, A4 = −5.97566E−05, A6 = 1.06956E−06,
A8 = 7.25717E−08, A10 = −1.28150E−09

5$^{th}$ surface

K = 0.872, A4 = 1.38127E−04, A6 = 8.41991E−06,
A8 = −1.79172E−07, A10 = 1.55041E−08

8$^{th}$ surface

K = 0.000, A4 = −4.34213E−04, A6 = −5.44693E−06,
A8 = 1.98968E−07, A10 = −7.67121E−09

10$^{th}$ surface

K = 0.000, A4 = −5.41691E−04, A6 = 8.07223E−06,
A8 = −8.66528E−07, A10 = 3.04638E−07

-continued

11$^{th}$ surface

K = 0.000, A4 = 6.94786E−04, A6 = 3.34028E−05,
A8 = −1.71747E−06, A10 = 5.44508E−07

16$^{th}$ surface

K = 0.000, A4 = 3.01173E−05, A6 = −7.61110E−06,
A8 = 3.34259E−07, A10 = −4.98513E−09

Zoom lens data

| Zoom ratio | 9.56 | |
|---|---|---|
| | Wide-angle | Change of point on the wide-angle side | Intermediate |

| | Wide-angle | Change of point on the wide-angle side | Intermediate |
|---|---|---|---|
| Focal length | 6.19 | 11.52 | 19.20 |
| F-number | 3.40 | 4.50 | 4.62 |
| Angle of view | 71.53 | 37.30 | 22.42 |
| Image height | 3.88 | 3.88 | 3.88 |
| Total lens length | 41.81 | 48.97 | 54.50 |
| BF | 7.07 | 5.80 | 5.66 |
| d3 | 0.42 | 5.59 | 10.65 |
| d8 | 15.15 | 11.65 | 8.85 |
| d14 | 3.19 | 9.94 | 13.35 |
| d16 | 5.56 | 4.35 | 4.23 |

| | Change of point on the telephoto side | Telephoto |
|---|---|---|
| Focal length | 34.43 | 59.17 |
| F-number | 5.44 | 5.98 |
| Angle of view | 12.75 | 7.49 |
| Image height | 3.88 | 3.88 |
| Total lens length | 59.73 | 61.43 |
| BF | 5.45 | 4.80 |
| d3 | 14.99 | 18.51 |
| d8 | 5.53 | 1.79 |
| d14 | 17.77 | 20.34 |
| d16 | 4.01 | 3.31 |

Data on zoom lens groups

| Group | Starting surface | Focal length |
|---|---|---|
| 1 | 1 | 35.50 |
| 2 | 5 | −7.94 |
| 3 | 10 | 11.46 |
| 4 | 12 | 17.41 |

Numerical Example 2
Unit mm

Surface data

| Surface No. | r | d | nd | vd |
|---|---|---|---|---|
| 1 | 24.303 | 0.60 | 1.94595 | 17.98 |
| 2 | 20.237 | 3.76 | 1.59201 | 67.02 |
| 3 (Aspheric surface) | −82.436 | Variable | | |
| 4 (Aspheric surface) | −219.740 | 0.80 | 1.85135 | 40.10 |
| 5 (Aspheric surface) | 7.141 | 2.53 | | |
| 6 | −47.821 | 1.82 | 1.94595 | 17.98 |
| 7 | −12.245 | 0.70 | 1.77377 | 47.17 |
| 8 (Aspheric surface) | 919.839 | Variable | | |
| 9 (Stop) | ∞ | 0.00 | | |
| 10 (Aspheric surface) | 4.768 | 2.63 | 1.59201 | 67.02 |
| 11 (Aspheric surface) | −24.563 | 0.10 | | |
| 12 | 8.337 | 1.59 | 1.49700 | 81.54 |
| 13 | −10.981 | 0.42 | 1.62004 | 36.26 |
| 14 | 3.430 | Variable | | |
| 15 (Aspheric surface) | 21.480 | 2.76 | 1.58313 | 59.38 |
| 16 (Aspheric surface) | −15.083 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.40 | | |
| Image plane | ∞ | | | |

-continued

Aspheric surface data

3$^{rd}$ surface

K = 0.000, A4 = 9.88614E−06, A6 = −1.28397E−08,
A8 = 1.38079E−10, A10 = −8.10609E−13

4$^{th}$ surface

K = 0.000, A4 = −1.03099E−04, A6 = −1.36657E−07,
A8 = 2.92640E−08, A10 = −3.65204E−10

5$^{th}$ surface

K = 0.023, A4 = 7.26110E−05, A6 = −2.75668E−06,
A8 = 3.09987E−07, A10 = −1.63736E−08

8$^{th}$ surface

K = 0.063, A4 = −3.13000E−04, A6 = −2.92989E−06,
A8 = 1.78401E−07

10$^{th}$ surface

K = 0.000, A4 = −4.61273E−04, A6 = 5.42473E−06,
A8 = −4.53290E−07, A10 = 2.94654E−07

11$^{th}$ surface

K = 0.000, A4 = 1.00343E−03, A6 = 4.28360E−05,
A8 = −1.89374E−06, A10 = 8.23287E−07

15$^{th}$ surface

K = 0.149, A4 = 2.11614E−05, A6 = 2.04085E−06,
A8 = −5.91451E−07, A10 = 1.16248E−08

16$^{th}$ surface

K = 0.029, A4 = 5.23199E−05, A6 = −5.01045E−06,
A8 = −3.86855E−07, A10 = 9.37526E−09

Zoom lens data

| Zoom ratio | 9.56 | |
|---|---|---|

| | Wide-angle | Change of point on the wide-angle side | Intermediate |
|---|---|---|---|
| Focal length | 5.12 | 8.90 | 15.88 |
| F-number | 3.30 | 4.45 | 5.50 |
| Angle of view | 79.84 | 47.73 | 27.30 |
| Image height | 3.88 | 3.88 | 3.88 |
| Total lens length | 41.69 | 46.74 | 53.41 |
| BF | 6.40 | 5.18 | 4.48 |
| d3 | 0.30 | 3.40 | 8.75 |
| d8 | 15.57 | 11.92 | 8.99 |
| d14 | 1.72 | 8.54 | 13.49 |
| d16 | 4.89 | 3.73 | 3.06 |

| | Change of point on the telephoto side | Telephoto |
|---|---|---|
| Focal length | 28.15 | 48.91 |
| F-number | 6.20 | 5.97 |
| Angle of view | 15.74 | 9.08 |
| Image height | 3.88 | 3.88 |
| Total lens length | 58.74 | 58.71 |
| BF | 4.54 | 4.94 |
| d3 | 14.04 | 18.86 |
| d8 | 5.87 | 1.48 |
| d14 | 16.60 | 15.72 |
| d16 | 3.12 | 3.45 |

Data on zoom lens groups

| Group | Starting surface | Focal length |
|---|---|---|
| 1 | 1 | 35.25 |
| 2 | 5 | −7.69 |
| 3 | 10 | 11.47 |
| 4 | 12 | 15.63 |

-continued

Numerical Example 3
Unit mm

Surface data

| Surface No. | r | d | nd | vd |
|---|---|---|---|---|
| 1 | 47.985 | 0.80 | 1.92286 | 18.90 |
| 2 | 28.243 | 0.05 | | |
| 3 | 21.248 | 4.08 | 1.77250 | 49.60 |
| 4 (Aspheric surface) | −116.425 | Variable | | |
| 5 (Aspheric surface) | 165.072 | 0.80 | 1.83481 | 42.71 |
| 6 (Aspheric surface) | 7.304 | 2.03 | | |
| 7 | −91.810 | 1.90 | 1.94595 | 17.98 |
| 8 | −10.823 | 0.80 | 1.83481 | 42.71 |
| 9 (Stop) | 17.995 | Variable | | |
| 10 (Stop) | ∞ | 0.30 | | |
| 11 (Aspheric surface) | 5.280 | 2.46 | 1.49700 | 81.54 |
| 12 (Aspheric surface) | −14.512 | 0.28 | | |
| 13 | 6.294 | 1.51 | 1.77250 | 49.60 |
| 14 | 8.181 | 0.80 | 2.00068 | 25.47 |
| 15 | 3.729 | Variable | | |
| 16 (Aspheric surface) | 473.250 | 3.74 | 1.74330 | 49.33 |
| 17 (Aspheric surface) | −11.842 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $4^{th}$ surface

K = 0.654, A4 = 1.17011E−05, A6 = −1.96762E−09,
A8 = −8.17022E−12, A10 = 5.12387E−15

$5^{th}$ surface

K = 0.000, A4 = −8.24711E−05, A6 = −2.76503E−06,
A8 = 2.27122E−07, A10 = −3.15083E−09

$6^{th}$ surface

K = 0.787, A4 = 6.34033E−05, A6 = 1.04135E−05,
A8 = −1.27967E−06, A10 = 4.22656E−08

$9^{th}$ surface

K = 0.000, A4 = −5.37026E−04, A6 = −1.90025E−05,
A8 = 2.82021E−06, A10 = −1.02639E−07

$11^{th}$ surface

K = 0.000, A4 = −4.84682E−04, A6 = 1.18845E−05,
A8 = −1.28144E−06, A10 = 4.10225E−07

$12^{th}$ surface

K = 0.000, A4 = 8.84774E−04, A6 = 3.84287E−05,
A8 = −4.12823E−06, A10 = 8.33734E−07

$16^{th}$ surface

K = 0.000, A4 = 9.93673E−21, A6 = 1.56889E−05,
A8 = −2.27236E−07, A10 = 6.31860E−10

$17^{th}$ surface

K = 0.000, A4 = 9.09060E−05, A6 = 1.67850E−05,
A8 = −2.42650E−07

Zoom lens data

| Zoom ratio | 20.42 |
|---|---|

| | Wide-angle | Change of point on the wide-angle side | Intermediate |
|---|---|---|---|
| Focal length | 4.84 | 9.46 | 19.35 |
| F-number | 3.60 | 4.81 | 5.10 |
| Angle of view | 84.61 | 44.21 | 22.47 |
| Image height | 3.88 | 3.88 | 3.88 |
| Total lens length | 43.74 | 50.43 | 59.79 |
| BF | 5.81 | 5.47 | 4.65 |
| d4 | 0.06 | 5.04 | 11.53 |
| d9 | 14.64 | 10.80 | 8.50 |
| d15 | 3.66 | 9.55 | 15.55 |
| d17 | 4.27 | 3.97 | 3.18 |

| | Change of point on the telephoto side | Telephoto |
|---|---|---|
| Focal length | 38.14 | 98.91 |
| F-number | 5.58 | 8.01 |
| Angle of view | 11.55 | 4.59 |
| Image height | 3.88 | 3.88 |
| Total lens length | 67.73 | 69.30 |
| BF | 6.60 | 3.02 |
| d4 | 16.83 | 21.12 |
| d9 | 5.21 | 1.27 |
| d15 | 19.54 | 24.34 |
| d17 | 5.15 | 1.46 |

Data on zoom lens groups

| Group | Starting surface | Focal length |
|---|---|---|
| 1 | 1 | 34.31 |
| 2 | 5 | −5.81 |
| 3 | 10 | 10.11 |
| 4 | 12 | 15.59 |

Numerical Example 4
Unit mm

Zoom lens data

| | Wide-angle | Change of point on the wide-angle side | Intermediate |
|---|---|---|---|
| Focal length | 6.19 | 11.52 | 19.20 |
| F-number | 3.40 | 4.50 | 4.62 |
| Angle of view | 67.48 | 39.84 | 24.00 |
| Image height | 3.64 | 3.88 | 3.88 |

| | Change of point on the telephoto side | Telephoto |
|---|---|---|
| Focal length | 34.43 | 59.17 |
| F-number | 5.44 | 5.98 |
| Angle of view | 13.70 | 8.07 |
| Image height | 3.88 | 3.88 |

Numerical Example 5
Unit mm

Zoom lens data

| | Wide-angle | Change of point on the wide-angle side | Intermediate |
|---|---|---|---|
| Focal length | 5.12 | 8.90 | 15.88 |
| F-number | 3.30 | 4.45 | 5.50 |
| Angle of view | 77.61 | 47.73 | 27.30 |
| Image height | 3.74 | 3.88 | 3.88 |

| | Change of point on the telephoto side | Telephoto |
|---|---|---|
| Focal length | 28.15 | 48.91 |
| F-number | 6.20 | 5.97 |
| Angle of view | 15.74 | 9.08 |
| Image height | 3.88 | 3.88 |

Numerical Example 6
Unit mm

Zoom lens data

| | Wide-angle | Change of point on the wide-angle side | Intermediate |
|---|---|---|---|
| Focal length | 4.84 | 9.46 | 19.35 |
| F-number | 3.60 | 4.81 | 5.10 |

-continued

| | | | |
|---|---|---|---|
| Angle of view | 81.88 | 44.21 | 22.47 |
| Image height | 3.69 | 3.88 | 3.88 |

| | Change of point on the telephoto side | Telephoto |
|---|---|---|
| Focal length | 38.14 | 98.91 |
| F-number | 5.58 | 8.01 |
| Angle of view | 11.55 | 4.59 |
| Image height | 3.88 | 3.88 |

FIGS. 12 to 17 are aberration diagrams for Examples 1, 2 and 3 upon focusing on an object point at infinity. In these aberration diagrams, (a), (b) and (c) are indicative of spherical aberrations, astigmatism, distortion and chromatic aberration of magnification at the wide-angle end, in the intermediate state, and at the telephoto end, respectively, and FIY stands for an image height.

Note here that there are no aberration diagrams presented for Examples 4, 5 and 6 attached hereto because they are similar in construction to Examples 1, 2 and 3, respectively.

Set out below are the values of conditions (1) to (10) in Examples 1, 2 and 3.

| Condition | Example 1 | Example 2 | Example 3 |
|---|---|---|---|
| (1) | 0.972 | 1.174 | 0.779 |
| (2) | 0.88 | 0.86 | 0.88 |
| (3) | 0.72 | 0.73 | 0.75 |
| (4) | 0.60 | 0.72 | 0.35 |
| (5) | 0.13 | 0.16 | 0.06 |
| (6) | 0.19 | 0.23 | 0.10 |
| (7) | 9.56 | 9.55 | 20.42 |
| (8) | 0.94 | 1.12 | 1.27 |
| (9) | 0.63 | 0.76 | 0.80 |
| (10) | 15.91 | 15.21 | 17.94 |

Each example may be modified as follows.

In the zoom lens of each example, barrel distortion is produced on the rectangular photoelectric transformation plane at the wide-angle end, while the occurrence of distortion is hold back near the intermediate focal length or at the telephoto end. For electrical correction of distortion, the effective imaging area should preferably be configured into barrel form at the wide-angle end and rectangular form near the intermediate focal length or at the telephoto end. And the predetermined effective imaging area is transformed by image processing into rectangular image information with reduced distortion. The image height $I_{mw}$ at the wide-angle end is less than the image height $I_{ms}$ in the intermediate focal length state or the image height $I_{mt}$ at the telephoto end.

Preferably, the zoom lens has an image transformation block in which electric signals for an image taken through the zoom lens are transformed into image signals that are corrected by image processing for color shifts from chromatic aberration of magnification. Electric correction of the zoom lens for chromatic aberration of magnification is going to make sure much better images are obtained.

Generally speaking, an electronic still camera is designed such that the image of a subject is separated into three primary colors images: the first, the second and the third primary color image, so that the respective output signals are superposed one upon another by operation to reconstruct a color image. Suppose here that a zoom lens has chromatic aberration of magnification. Then, given an image from light of the first primary color, the positions where light of the second and the third primary color is imaged are going to be off the position where the light of the first primary color is imaged. For electronic correction of the image for chromatic aberration of magnification, the amount of shifts of the imaging positions for the second and the third primary color from that for the first primary color is previously found for each pixel of an imaging device based on aberration information about the zoom lens. Then, coordination transformation is implemented such that only the amount of the shifts from the first primary color is corrected for each pixel of the taken image.

Referring typically to an image made up of three primary colors output signals of red (R), green (G) and blue (B), shifts of the imaging positions R and B from G are first found for each pixel. Then, coordination transformation is applied to the taken image to eliminate any shift from G, and finally signals of R and G are produced.

Chromatic aberration of magnification varies with zoom, focus and f numbers; it is preferable that the amount of shifts of the second and the third primary color from the first primary color is stored as correction data in a storage device for each lens position (zoom, focus and f numbers). By referring to this correction data depending on the zoom position, it is possible to produce the second and the third primary color signals that are corrected for the shifts of the second and the third primary color from the first primary color signal.

To cut off unessential light such as ghosts and flares, it is acceptable to rely on a flare stop other than the aperture stop.

That flare stop may then be located somewhere on the object side of the first lens group, between the first and the second lens group, between the second and the third lens group, between the third and the fourth lens group, between the fourth and the fifth lens group, and between the group nearest to the image plane side and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for the adjusting the focus is implemented with the lens group nearest to the image plane side. Focusing with that lens group eases off loads on a motor because the lens weight is light, and works for making the lens barrel compact because there is none of the change in the total length during zooming, and a drive motor is mounted in the lens barrel.

As noted just above, it is desired that focusing for adjusting the focus is implemented with the lens group nearest to the image plane side; however, it may be implemented with the first, the second or the third, or by the movement of multiple lens groups. The movement of multiple lens groups is more effectively capable of holding back deterioration of the performance in association with focusing. Furthermore, focusing may be implemented by letting out the whole lens system or letting out or in some lenses.

The shading of brightness at the peripheral position of an image may be reduced by shifting the mircolenses of a CCD. For instance, the CCD microlens design may be modified in conformity with the angle of incidence of light rays at each image height, or decreases in the quantity of light at the peripheral position of the image may be corrected by image processing.

By the way, an antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it would be particularly effective to have an antireflection coating applied on the cementing surface.

Effective use of cementing surface coating is disclosed in JP(A) s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the invention, too, the cementing lens surface in the first lens group of positive power may just as well be coated, as set forth there.

Depending on the refractive index of the lens involved and the refractive index of the adhesive material used, use may be made of coating materials of relatively high refractive indices such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive indices such as $MgF_2$, $SiO_2$, and $Al_2O_3$. These coating materials may then have a suitable thickness selected in such a way as to meet phase conditions. As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc. On the base of a similar idea, cementing surface coating can effectively be applied to lens cementing surfaces other than those in the first lens group, too.

Figure 18:
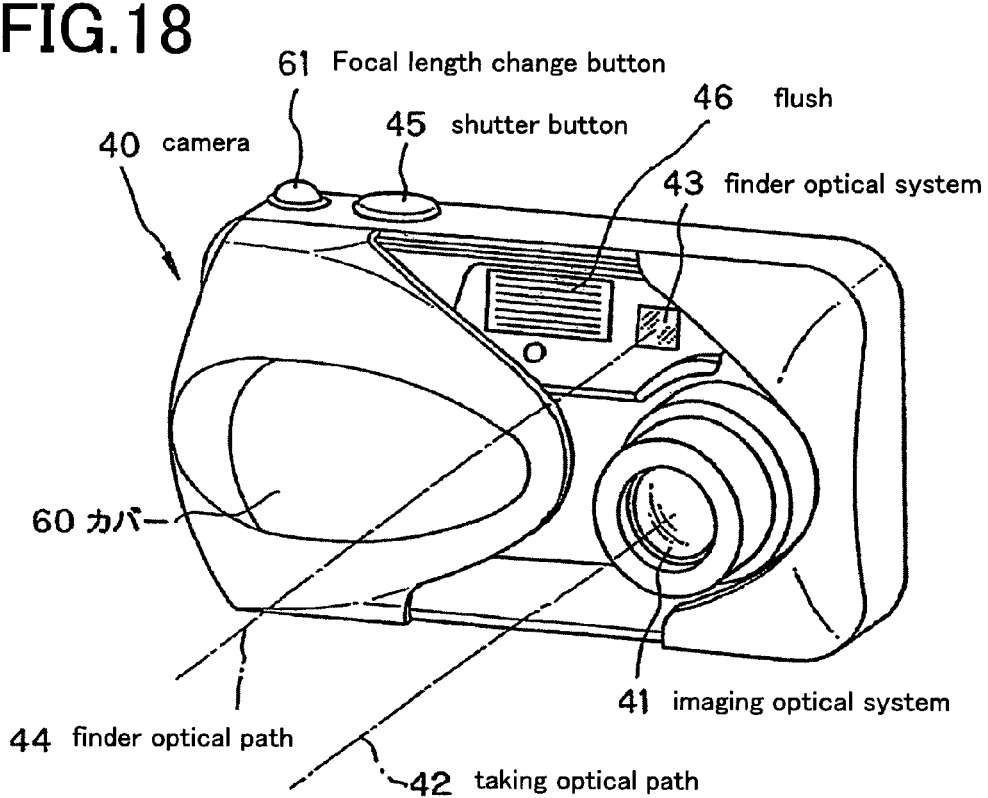
FIG. 18 is a front perspective view of the outside shape of a digital camera according to the invention.
Figure 19:
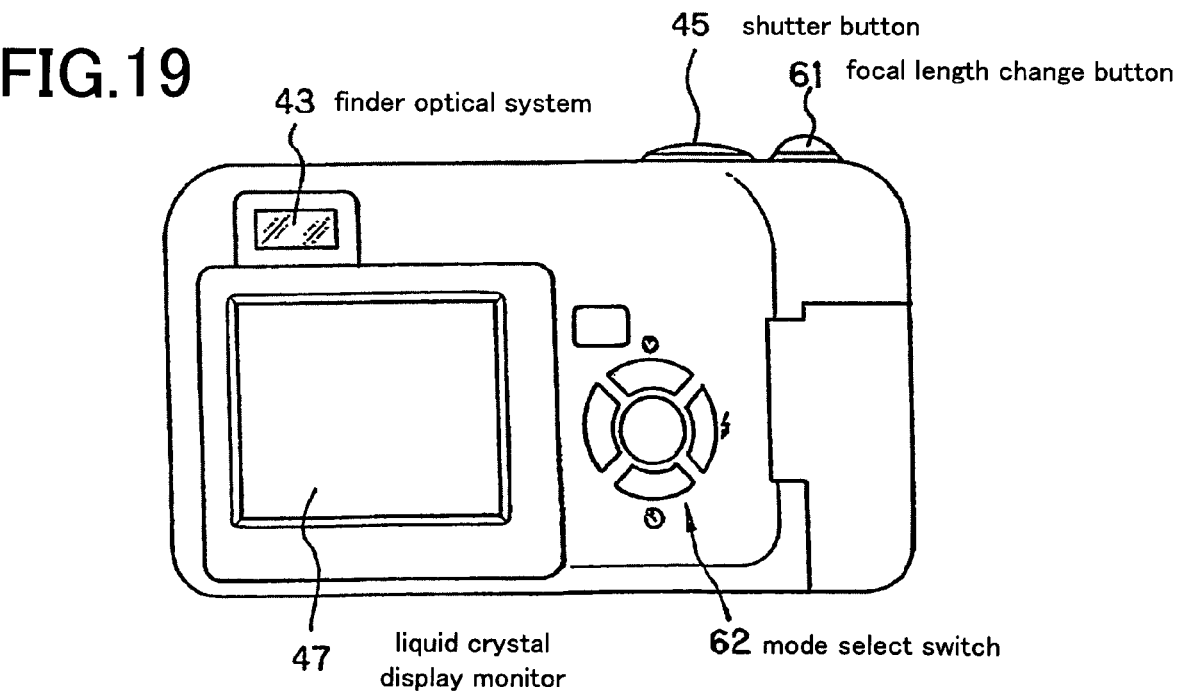
FIG. 19 is a rear perspective view of the digital camera of FIG. 18.
Figure 20:
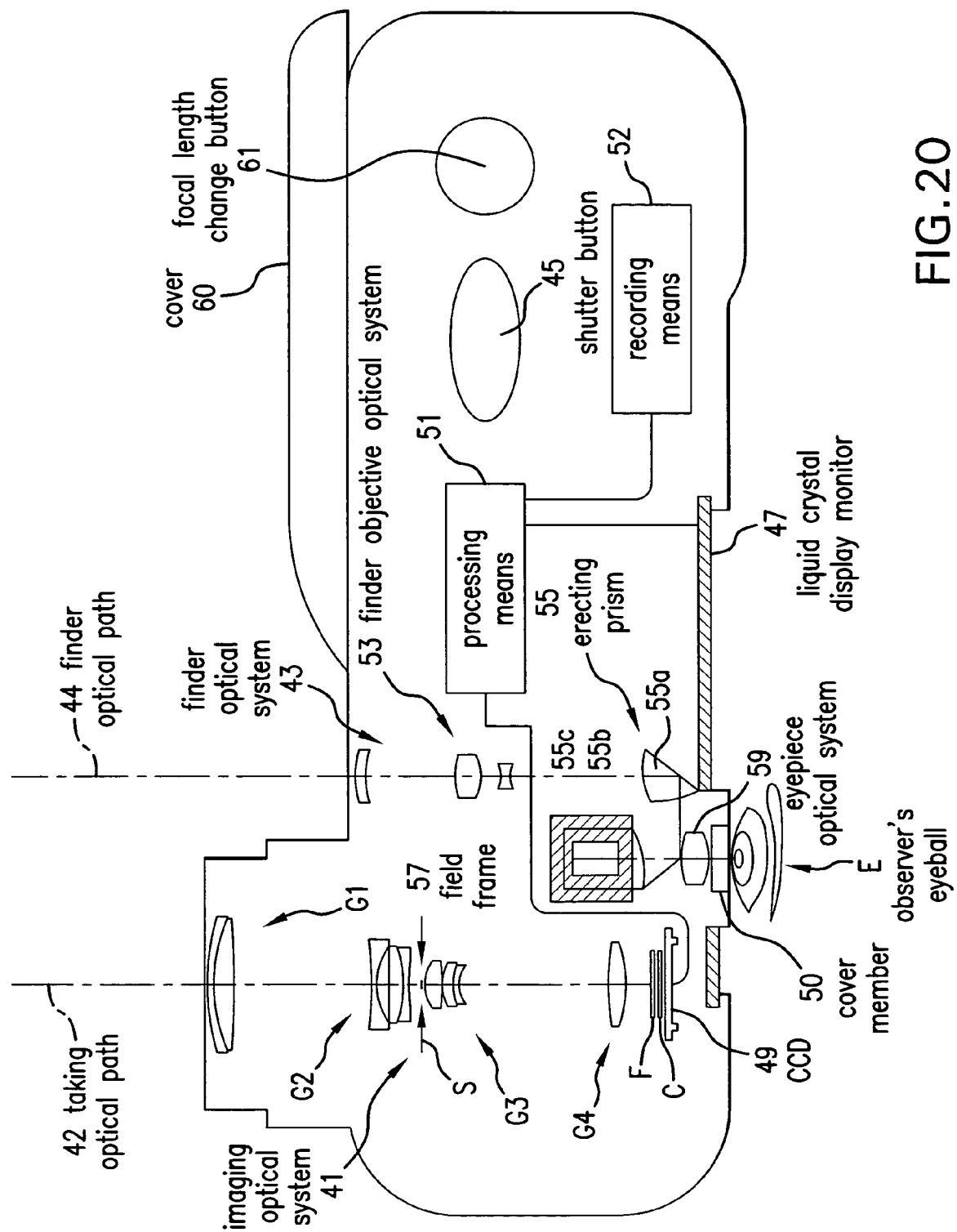
FIG. 20 is a sectional view of the digital camera of FIG. 18.

FIGS. 18, 19 and 20 are conceptual illustrations of a digital camera, in which such an inventive zoom lens as set forth above is incorporated in a taking optical system 41. FIG. 18 is a front perspective view of the appearance of a digital camera 40; FIG. 19 is a rear perspective view of the same; and FIG. 20 is a schematic sectional view of the setup of the digital camera 40. However, FIGS. 18 and 20 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 18. As the shutter button 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be set up in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 18-13) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 21:
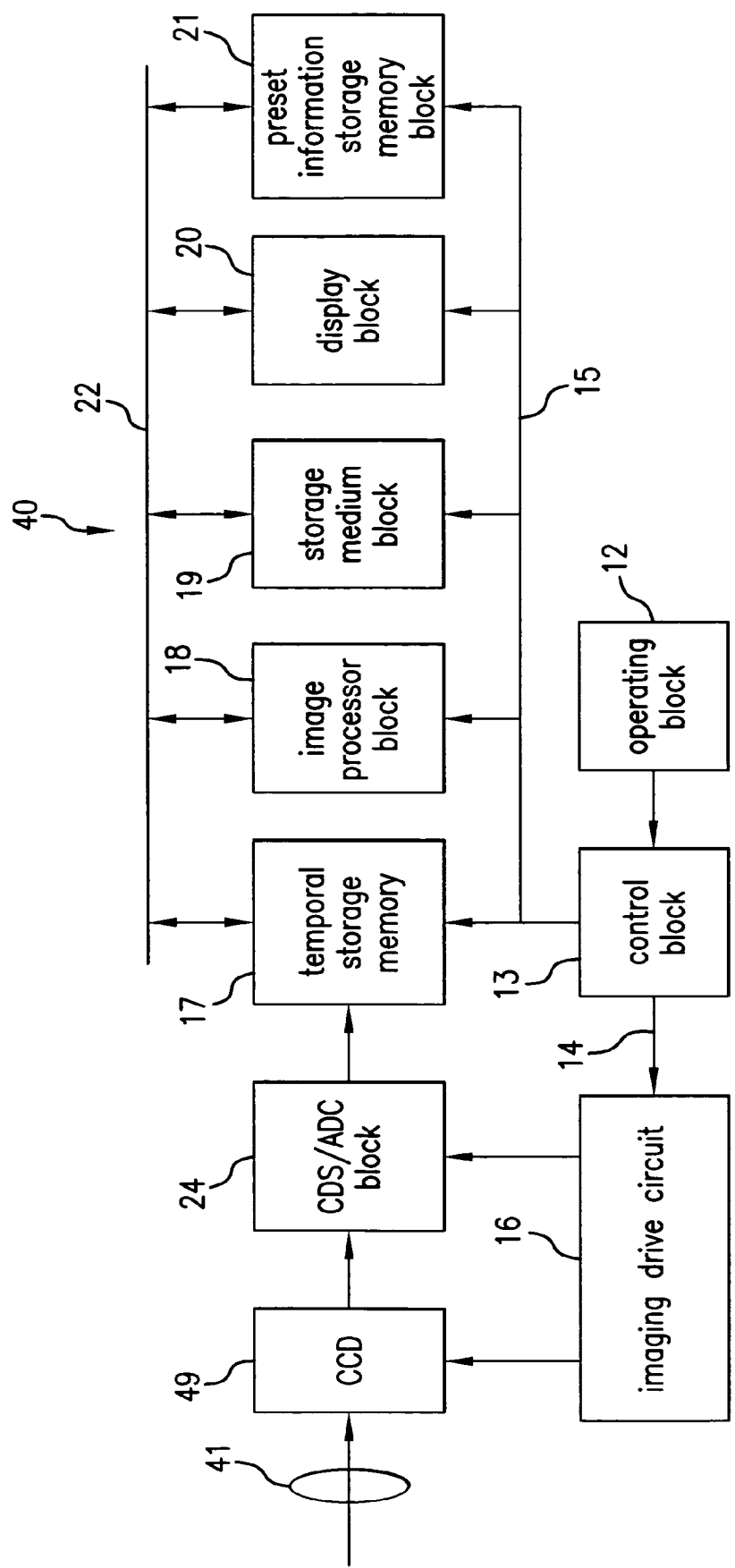
FIG. 21 is a block diagram illustrative of the construction of internal circuits in part of the digital camera of FIG. 18.

FIG. 21 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 21, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What is claimed is:

1. A zoom lens comprising, in order from an object side thereof,
    a positive first lens group,
    a negative second lens group,
    a positive third lens group, and
    a positive fourth lens group, wherein:
    zooming is implemented by changing a spacing between the respective lens groups;
    upon received in a lens mount, said third lens group is shifted and positioned while its optical axis is tilted at an angle of ±45° with those of other lens groups or placed substantially horizontal; and
    at least one of lenses in said second lens group or said fourth lens group is configured such that a portion of said at least one lens proximate to said third lens group being received in the lens mount is cut away; with satisfaction of the following condition (1):

$$0.3 < d \times (F_{nt}/f_t) < 3.0 \quad (1)$$

where d is a distance between a center point of axial thickness of said third lens group being received in the lens mount and the optical axis,
$F_{nt}$ is an F-number at a telephoto end, and
$f_t$ is a focal length at the telephoto end.

2. The zoom lens according to claim 1, which further satisfies the following conditions (2) and (3):

$$0.50 < R_2'/R_2 < 0.95 \quad (2)$$

$$0.50 < R_4'/R_4 < 0.95 \quad (3)$$

where $R_2$ is a length from a lens's effective surface end farthest off an optical axis position of the cut lens surface in the aforesaid second lens group to the optical axis position,
$R_2'$ is a length from a lens's effective surface end nearest to the optical axis position of the cut lens surface in the aforesaid second lens group to the optical axis position,
$R_4$ is a length from a lens's effective surface end farthest off an optical axis position of the cut lens surface in the aforesaid fourth lens group to the optical axis position,
$R_4'$ is a length from a lens's effective surface end nearest to the optical axis position of the cut lens surface in the aforesaid fourth lens group to the optical axis position.

3. The zoom lens according to claim 1, which further includes light shield means for shielding off light reflected at a cut surface of the cut lens in said second lens group or said fourth lens group.

4. The zoom lens according to claim 1, wherein:
    said second lens group comprises, in order from its object side,
    a negative lens element concave on its image side, and
    at least one positive lens element located on an image side, wherein a portion thereof proximate to the third lens group being received in the lens mount is cut away.

5. The zoom lens according to claim 1, wherein:
    said fourth lens group comprises a positive lens configured such that a portion thereof proximate to the third lens group being received in the lens mount is cut away.

6. The zoom lens according to claim 1, which further satisfies the following condition (4):

$$0.2 < f_1/f_t < 0.86 \quad (4)$$

where $f_1$ is the focal length of said first lens group, and
$f_t$ is a focal length of the whole zoom lens system at the telephoto end.

7. The zoom lens according to claim 1, which further satisfies the following condition (5):

$$0.02 < |f_2/f_t| < 0.50 \quad (5)$$

where $f_2$ is a focal length of said second lens group, and
$f_t$ is a focal length of the whole zoom lens system at the telephoto end.

8. The zoom lens according to claim 1, which further satisfies the following condition (6):

$$0.2 < f_3/f_t < 0.60 \quad (6)$$

where $f_3$ is a focal length of said third group, and
$f_t$ is a focal length of the whole zoom lens system at the telephoto end.

9. The zoom lens according to claim 1, which further comprises an aperture stop, and wherein:
    upon zooming from a wide-angle end to a telephoto end,
    said first group moves in such a way as to be positioned more on the object side at the telephoto end than at the wide-angle end;
    said second group moves;

said third group moves in such a way as to be positioned more on the object side at the telephoto end than at the wide-angle end; and said aperture stop moves.

10. The zoom lens according to claim 1, which further satisfies the following condition (7):

$$4.0 < f_t/f_w < 40.0 \tag{7}$$

where $f_t$ is a focal length of the whole zoom lens system at the telephoto end, and $f_w$ is a focal length of the whole zoom lens system at the wide-angle end.

11. An electronic imaging apparatus, comprising a zoom lens as recited in claim 1, and an electronic imaging device.

12. The electronic imaging apparatus according to claim 11, which satisfies the following condition (8):

$$0.40 \leq \Sigma d_{1G}/I_{mw} < 3.00 \tag{8}$$

where $\Sigma d_{1G}$ is am axial thickness of said first group, and $I_{mw}$ is a maximum image height at the wide-angle end.

13. The electronic imaging apparatus according to claim 11, which further satisfies the following condition (9):

$$0.50 < I_{mw}/f_w < 1.00 \tag{9}$$

where $I_{mw}$ is a maximum image height at the wide-angle end, and $f_w$ is a focal length of the whole zoom lens system at the wide-angle end.

14. The electronic imaging apparatus according to claim 11, which further satisfies the following condition (10):

$$5.0 < L_t/I_{mw} < 20.0 \tag{10}$$

where $L_t$ is a total length of the whole zoom lens system at the telephoto end, and $I_{mw}$ is a maximum image height at the wide-angle end.

15. The electronic imaging apparatus according to claim 11, which further comprises an image transformation block wherein electric signals containing distortion from said zoom lens are transformed into image signals with distortion corrected by image processing.

16. The electronic imaging apparatus according to claim 11, which further comprises an image transformation block wherein electric signals of an image taken by said zoom lens are transformed into image signals that are corrected by image processing for a color shift resulting from chromatic aberration of magnification.

* * * * *